(12) United States Patent
Djuric

(10) Patent No.: US 12,307,565 B2
(45) Date of Patent: May 20, 2025

(54) NOTIFICATION APPLICATION FOR A COMPUTING DEVICE

(71) Applicant: Marko Djuric, Belgrade (RS)

(72) Inventor: Marko Djuric, Belgrade (RS)

(73) Assignee: Marko Djuric, Belgrade (RS)

( * ) Notice: Subject to any disclaimer, the term of this patent is extended or adjusted under 35 U.S.C. 154(b) by 0 days.

(21) Appl. No.: 17/994,273

(22) Filed: Nov. 25, 2022

(65) Prior Publication Data

US 2023/0298242 A1    Sep. 21, 2023

Related U.S. Application Data

(63) Continuation of application No. PCT/IB2021/054625, filed on May 27, 2021.
(Continued)

(51) Int. Cl.
*G06T 13/40* (2011.01)
*G06F 3/04886* (2022.01)
(Continued)

(52) U.S. Cl.
CPC .......... *G06T 13/40* (2013.01); *G06F 3/04886* (2013.01); *G06T 3/40* (2013.01);
(Continued)

(58) Field of Classification Search
CPC ....... G06T 3/40; G06T 17/00; G06T 2200/24; G06F 3/04886; G06F 2203/04804; H04M 1/72403
See application file for complete search history.

(56) References Cited

U.S. PATENT DOCUMENTS

2005/0088452 A1* 4/2005 Hanggie ............... G06F 3/0481
                                                                    345/581
2013/0055112 A1   2/2013 Joseph et al.
(Continued)

FOREIGN PATENT DOCUMENTS

EP          3312713 A1    4/2018

OTHER PUBLICATIONS

Carl Gutwin et al, "Gone but not forgotten", Computer Supported Cooperative Work, ACM, 2 Penn Plaza, Suite 701 New York NY 10121-0701 USA,Feb. 6, 2010 (Feb. 6, 2010), p. 179-188.

*Primary Examiner* — Michelle Chin
(74) *Attorney, Agent, or Firm* — The Watson IP Group, PLC; Jovan N. Jovanovic

(57) ABSTRACT

A method and computing device comprise a display and a processor to execute a graphics engine and a notification application. The graphics engine displays, on the display, an object overlaid on at least one of a home screen of the computing device and an application running on the computing device. The object includes a transparent background that allows a user to interact with the at least one of a home screen of the computing device and an application running on the computing device, while the object is overlaid on at least one of a home screen of the computing device and an application running on the computing device. The notification application tracks perimeter coordinates of the object, the perimeter coordinates differentiating an area of the display displaying the object and an area of the display surrounding the object. The notification application further overlays a shape on the object based on the perimeter coordinates, the shape being an interactive zone for the user to interact with the object.

15 Claims, 18 Drawing Sheets

Related U.S. Application Data

(60) Provisional application No. 63/030,493, filed on May 27, 2020.

(51) Int. Cl.
*G06T 3/40* (2024.01)
*G06T 17/00* (2006.01)
*H04M 1/72403* (2021.01)

(52) U.S. Cl.
CPC ......... *G06T 17/00* (2013.01); *H04M 1/72403* (2021.01); *G06F 2203/04804* (2013.01); *G06T 2200/24* (2013.01)

(56) References Cited

U.S. PATENT DOCUMENTS

| | | |
|---|---|---|
| 2015/0160808 A1 | 6/2015 | Walkin et al. |
| 2017/0220314 A1 | 8/2017 | Kaneko et al. |
| 2018/0188903 A1 | 7/2018 | Sirpal et al. |
| 2018/0350144 A1 | 12/2018 | Rathod |
| 2019/0287307 A1* | 9/2019 | Rogers .................... G06T 15/08 |
| 2020/0082195 A1* | 3/2020 | Agarwal ............ H04N 1/00129 |

* cited by examiner

NOTIFICATION APPLICATION FOR A COMPUTING DEVICE

CROSS-REFERENCE TO RELATED APPLICATION

This application claims priority from U.S. Patent Application Ser. No. 63/030,493, filed May 27, 2020, entitled "NOTIFICATION APPLICATION FOR A COMPUTING DEVICE", the entire specification of which is hereby incorporated by reference in its entirety.

FIELD OF THE DISCLOSURE

The disclosure relates in general to notification, and more particularly, to a notification application for a computing device.

BACKGROUND ART

Computing devices have proliferated throughout society. Such computing devices can include stationary devices, such as personal computers, and mobile devices, such as cellular phones. With both of these types of computing devices, for both work and personal uses users receive various types of notifications throughout a user's day. Users execute applications, or "apps" on their computing devices to receive these notifications. For example, users can receive text notifications that a user has received a new text message, email notifications that a user has received a new email message, etc. Messaging and notification services that provide notifications include Short Message Service (SMS), email, Facebook messenger, Instagram, Twitter, and any of numerous other types of messaging and/or notification services that provide notifications.

SUMMARY OF THE DISCLOSURE

The disclosure is directed to a computing device comprising a display and a processor to execute a graphics engine and a notification application. The graphics engine displays, on the display, an object overlaid on at least one of a home screen of the computing device and an application running on the computing device. The object includes a transparent background that allows a user to interact with the at least one of a home screen of the computing device and an application running on the computing device, while the object is overlaid on at least one of a home screen of the computing device and an application running on the computing device. The notification application tracks perimeter coordinates of the object, the perimeter coordinates differentiating an area of the display displaying the object and an area of the display surrounding the object. The notification application further overlays a shape on the object based on the perimeter coordinates, the shape being an interactive zone for the user to interact with the object.

In some configurations, a size of the object changes on the display, with a size of the shape changing in accordance with a size of the object.

In some configurations, the object is an avatar.

In some configurations, the avatar is a three-dimensional (3D) avatar.

In some configurations, the avatar is a virtual 3D assistant avatar, with the graphics engine animating at least one of a head, an arm, a leg, a torso, and a mouth, of the virtual 3D assistant avatar.

In some configurations, the application is a first application, the virtual 3D assistant avatar assists a user of the computing device with installing a second application on the computing device.

In some configurations, the avatar is a 3D virtual tank avatar to "shoot" a message at a user of the computing device In some configurations, the message is displayed within a virtual smoke cloud.

In some configurations, the graphics engine is the Unity game engine by Unity Technologies.

In some configurations, the shape is one of a square, rectangle, pentagon, octagon, circle, and oval.

In some configurations, the notification application further activates an overlay feature within an operating system running on the computing device to display, on the display, the object overlaid on at least one of the home screen of the computing device and the application running on the computing device.

In some configurations, the notification application further disables interactivity by the user with a graphics player to allow the user to interact with a home screen of the computing device when the user leaves a user interface of the graphics player.

In some configurations, the notification application further disables code, from the graphics engine, that causes rendering to pause animation of the object.

In some configurations, the notification application further intercepts a text message received by the computing device from at least one server.

In some configurations, the notification application further provides a canned notification, with the object, of the interception of the text message.

In some configurations, the at least one server is an Android server, an email server, a Short Message Service (SMS) server, a Multimedia Message Service (MMS) server, a Twitter server, an Instagram server, a WhatsApp server, a Viber server, a Discord server, a WeChat server, a Line server, a TextFree server, a Kik server, a Tango server, a Piip server, a Facebook Messenger server, a Google Hangouts server, and a Skype server.

In some configurations, the object is overlay on a virtual keyboard.

In some configurations, the computing device is one of a smart phone, a tablet computer, a laptop computer, a desktop computer, and a smart watch.

The disclosure is also directed to a method that displays, by a graphics engine on a display, an object overlaid on at least one of a home screen of the computing device and an application running on the computing device, the object including a transparent background that allows a user to interact with the at least one of a home screen of the computing device and an application running on the computing device, while the object is overlaid on at least one of a home screen of the computing device and an application running on the computing device. The method further tracks, by a processor executing a notification application, perimeter coordinates of the object, the perimeter coordinates differentiating an area of the display displaying the object and an area of the display surrounding the object. The method even further overlays, by a processor executing the notification application, a shape on the object based on the perimeter coordinates, the shape being an interactive zone for the user to interact with the object.

In some configurations, the method further changes a size of the object on the display, and changes a size of the shape in accordance with a size of the object.

BRIEF DESCRIPTION OF THE DRAWINGS

The disclosure will now be described with reference to the drawings wherein.

DETAILED DESCRIPTION OF THE DISCLOSURE

Figure 1:
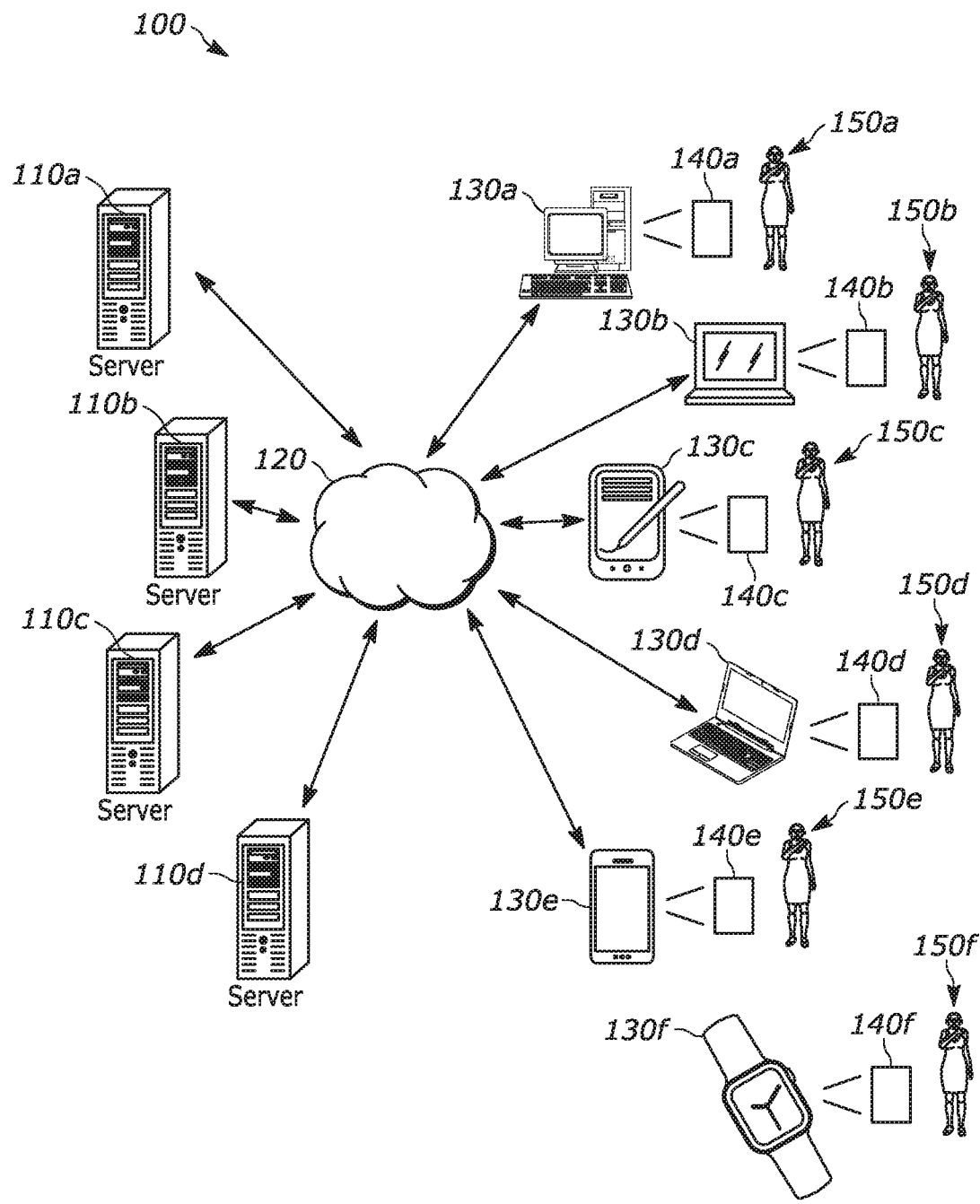
FIG. 1 illustrates an exemplary system with various computing device for executing a notification app, in accordance with at least one configuration disclosed herein.

While this disclosure is susceptible of configuration(s) in many different forms, there is shown in the drawings and described herein in detail a specific configuration(s) with the understanding that the present disclosure is to be considered as an exemplification and is not intended to be limited to the configuration(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

With reference to FIG. 1, a system 100 is disclosed that includes a plurality of servers, such as a plurality of servers 110a-d, in communication with a communication network 120 and a plurality of computing devices 130a-f, referenced herein as computing devices 130 for simplicity of description. Each of the plurality of computing devices 13 can execute a Notification Application 140a-f, respectively, discussed in more detail below with respect to Notification Application 140. In at least one configuration, at least one of the plurality of servers 110a-d can be at least one of an Android server, an email server, a Short Message Service (SMS) server, a Multimedia Message Service (MMS) server, a Twitter server, an Instagram server, a WhatsApp server, a Viber server, a Discord server, a WeChat server, a Line server, a TextFree server, a Kik server, a Tango server, a Piip server, a Facebook Messenger server, a Google Hangouts server, a Skype server, and/or any other existing or forthcoming messaging server. In at least one configuration, at least one of the plurality of servers 110a-d can part of the system 100 and also be of the type that provides information, such as sports scores, sports statistics, weather information, news, stock information, shopping information, and/or any other type of information users 150a-f, referenced herein as users 150 for simplicity of description, of the plurality of computing devices 130 would be interesting in being notified of. In at least one configuration, the plurality of computing devices 130 can each be of a same type of computing device or different computing devices, such as a smart phone, a tablet computer, a laptop computer, a desktop computer, a smart watch, or any other portable (e.g., wearable or non-wearable) and/or non-portable computing device that includes a display.

The following disclosure will be described for an Android based application. However, one skill in art will appreciate that such this disclosure applies equally to a chrome extension, and other existing and upcoming platforms. An example Notification Application 140 flow can begin with a user 150 installing the Notification Application 140 and then starting the Notification Application 140. After a custom splash screen, which in at least one configuration can vary with a use case, the user 150 signs up for notification service provided by the Notification Application 140, such as via social media login buttons and also provides an option with entry boxes to create a new account manually. In at least one configuration, the Notification Application 140 can provide virtual assistant services, psychological effect, and/or alleviation of loneliness by animating tasks performed by the computing devices 130. Next, the user 150 can give the Notification Application 140 permission for core features, such as "allow to appear on top of other apps", which terms of which can vary with whatever Android version the user 150 is using, and "allow to receive and read & send notifications". In at least one configuration, all permissions can be activated by the user 150 on the go, not to overwhelm the user 150 at the beginning of their experience with the Notification Application 140. For example, the first time the user 150 tries to activate certain features of the Notification Application 140, they will be asked to, and as can be explained by a mini tutorial, allow the permission in question. In an alternate configuration, the user 150 can agree on "non-system" permissions in the Google Playstore, the moment the user 150 selects to install the Notification Application 140.

Subsequent to the user 150 giving whatever permissions are needed for proper functionality of the Notification Application 140 as discussed above, the user 150 is presented with a main screen of the Notification Application 140, the main screen providing an avatars environment. Depending on the use case, which will be discussed in more detail below, the Notification Application 140 allows the user 150 to choose an avatar. In at least one configuration, the user 150 can select a celebrity avatar. In at least one configuration, a background can be predefined, but customizable by the user 150.

For example, the avatar can be displayed in the middle of the screen with a few buttons around the avatar that include: Shop, YouTube, Camera, Settings, Home and Customization. Depending on the version of the Notification Application 140, meaning if it's platform, for example, was used for a private label project, for example for a celebrity, the user 150 can enter the shop and purchase different things. The user 150 can achieve this purchase either through Frequent Player Points (FPP) accumulated with time (e.g., by voluntarily watching advertisement(s) performing daily or regular check-ins, and/or other reward actions) or through standard financial transactions, such as credit cards, bank transfer, google play store vouchers, or any other financial transaction. Virtual "things" and features the user 150 can buy include: extra slots for additional animations, new animations, extra slots for additional voice commands, new items, clothes, accessories, items for the environment like toys, furniture, special wall papers and/or any other accessories. The Notification Application 140 can then allow the user 150, either before or after customizing his settings and avatar, to leave this environment to his home screen, or any other screen of their choosing. Although this disclosure describes display of 3D objects on a home screen of the computing device 130, one skilled in the art would understand that the description applies equally to display of 3D objects on any screen of the computing device 130, even while executing or running apps on the computing device 130. Moreover, one skilled in the art would understand that the home screen of the computing device 130 can include multiple pages, each including links to apps, settings, and/or notifications. Furthermore, although this disclosure describes display of 3D objects, one skilled in the art would appreciate that such disclosure is but an example and can apply equally display of 2D objects.

Once configuration as discussed above is complete, the avatar of the user 150 (either customizer or not) starts appearing on the home screen of the user's 150 computing device 130. For example, the avatar can randomly, that is sets of different animations for different situations are available, move around the screen. In at least one configuration, the user's 150 chosen avatar can also appear overtop of another app that is currently being executed and displayed on the user's 150 computing device 130. The Notification Application 140 disclosed herein can present Three-dimensional (3D) avatars similar to that used by technology used by the app "Hellopet". This Hellopet app evolves around static sets of animated gifs that are manually combined into a flowing animation or scene. This technology limits uses 2D avatars that, through manual labor, can only create the illusion of a 3D avatar. Also, this Hellopet app limits the interaction between the user 150 and the avatar and therefore cannot achieve the same performance our configuration(s) bring, as discussed below. The Notification Application 140 disclosed herein unfolds on a transparent Unity player screen that places the user's 150 avatar overlaid on a background, such as a home screen or another app, all while the user 150 still has the option to instantly, that is via one click, interact with any other app in the background surrounding the avatar. The Notification Application 140 utilizes a Unity player module that is integrated into the Notification Application 140. The Notification Application 140 implements this Unity player to present real 3D objects and characters on the user's 150 computing device 130, all while giving the best options of touch interaction between the user 150 and the avatar.

The Notification Application 140 intercepts and presents incoming notifications from any app installed on the user's computing device 130, as well as any system notifications. The avatar alerts the user 150 with specific sets of animations, that the user 150 can extend by buying new animations via the Notification Application 140. These animations, activated by incoming notifications, can either happen while the user 150 is actively using his phone or when the user 150 unlocks his phone and enters the home screen. When the avatar, for example, holds up a sign that says "you got mail" the user 150 is, by touching that 3D sign on a screen of their computing device or by clicking the sign with their mouse, leads to the originating app that originated the notification, either opening the User Interface (UI) of the originating app or leading the user 150 directly to the message it-self. Depending on a length of a particular message, the Notification Application 140 can display the message in full within the 3D sign, held up by the avatar. Alternatively, the Notification Application 140 can display custom messages like "XXX needs you", with the "XXX" representing certain information that is pulled by the Notification Application 140 about an origin of this incoming notification. In different situations, such as when multiple notifications arrived while the user 150 was not active on his computing device, are recognized by the Notification Application 140 and again activate specific predefined animations for this scenario.

The Notification Application 140 can include a custom lock screen feature. The custom lock screen feature is a first feature after physically unlocking the computing device and presented before the pattern or password security screen. The custom lock screen feature allows the user 150 to see their avatar in-forming the user 150 about incoming notifications, and in at least one configuration interaction is only limited to the home screen.

In at least one configuration, the Notification Application 140 also allows the user 150 to interact with their avatar through prerecorded voice commands. The prerecorded voice commands can be customized, which instantly induces new sets of animations, specifically tailored to emotions like happy, sad, angry, excited, neutral etc. In at least one configuration, the Notification Application 140 can implement third-party emotion tracking software which allows for virtually full interaction with users 150, which creates not only a virtual and visible assistant for the users 150 but creates a virtual friend that in times where humans communicate more than ever, while the feeling of loneliness is stronger than ever, alleviates a feeling of isolation.

In at least one configuration, the Notification Application 140 can include in-app games. In at least one configuration, a game controller (like an Xbox controller) can be used to activate in-app games. For example, the Notification Application 140 can include a Random Fight Generator (RFG) game, a game where the user 150 does not actively participate, except for accepting a request for their avatar to fight. Based on the location request approved by the user's 150 social media login or the user 150 themselves, the Notification Application 140s "knows", that is receives location information detailing where every user's 150 computing device 130 is at any given time. When two user 150 computing devices 130 come within a predefined radius of each other they receive a notification on their screen, the notification requesting them to accept a fight between their avatars. After both parties have accepted the invite, they see each other's avatars, simultaneously appearing on each other's screens. The avatars then take out a fight, which can be completely randomized with no possible interference by the user 150. The results of the fight can be based on specific skills and attributes each avatar has. In at least one configuration, the Notification Application 140 gives users 150 an option to direct their avatars manually, the users 150 controlling the fight.

Another example game that the Notification Application 140 can provide to the users 150 is "Escape". Upon activating this game, a joystick can appear on a bottom right or bottom left side of a vertically held computing device. This joystick allows the user 150 to control his avatar and escape different objects entering the screen.

Another example game that the Notification Application 140 can provide to users 150 is "Match". This game allows the user 150 to search for a partner online that is has activated the same "Match" game. This game allows the users 150 to play multiplayer sub-games like Stick and Ball, Snake and/or Escape, with their avatar. In at least one configuration, simplified game versions, derived from sports like tennis, football and/or soccer, can also be played. All of these games, and any other games provided by the Notification Application 140, are played on a transparent background showing the home screen (or in other examples as discussed below a running app) and the avatar overtop of the home screen. In at least one configuration, while these games are activated the opportunity to interact with app icons on the users' 150 home screen is restricted and only possible upon stopping or pausing the game.

The Notification Application 140 is not limited to one or a few target audiences, like kids and teenagers. The Notification Application 140 is applicable to any target audience since it incorporates avatars, such as the 3D avatar discussed above, from any part of a user's 150 life. This can include animals, humans (fictive or not), drawn and animated fantasy characters, celebrities ranging from sports, music, film, series, tv, YouTube, gaming, and a personalized avatar created manually form pictures taken by the user 150, following specific instructions, and uploaded to the Notification Application 140. The creation of a personalized avatar, described below in detail, can be a fully automized process whose final result is a fully rigged and prepared 3D avatar with a likeness of the user 150, that technically complies with needed specifications to execute with the Notification Application 140.

Other examples of use cases for the Notification Application 140 can include sports, educational, promotional, and fashion/commercial. This list is not exhaustive as the number of use cases for the avatar disclosed herein is nearly limitless, only limited by imagination, as would be understood by those skilled in the art.

For the sports use case for the Notification Application 140, for example every player of a user's 150 favorite football team can be digitally turned into a 3D avatar, that is a replica of players wearing their team colors/uniforms. The Notification Application 140 can be connected, such as via an Application Program Interface (API), with a live sport results provider like www.flashscore.com or www.livescore.com.

When the user's 150 favorite team plays a live match, a scanned avatar of the specific player that caused the event, corresponds in real time, with specific animations, to events happening in that match. Events can include achieved/received goal, beginning, half time, final whistle, yellow or red cards, penalties, changes, starting line up, etc. These events, when presented overtop of the home screen, either after unlocking the computing device or while actively using it, are accompanied by real time general information about the ongoing match of the user's 150 favorite football (sports) team, minutes played, and/or overall score. As the Notification Application 140 uses a transparent background and at least one avatar, in this case the specific player that caused the event, can have permission to appear overtop of every app, either overtop of the home screen or overtop of another app, the user 150 is instantly informed about the event that occurred, in real-time, and about important facts from the match. By skipping the typical need to open a tab, click on a popup window, which does not include all of the information the Notification Application 140 instantly presents, the Notification Application 140 decreases the amount of time typically needed to transmit information from the computing device to the user 150.

For the educational use case for the Notification Application 140, the Notification Application 140 can be utilized by governments, scientist, medical personnel and/or personal use to inform specific target groups, in an example kids and teenagers, about actual events and can further include how to handle them. For this example, we will be referring to the COVID 19 pandemic. Because of the positive relation the user 150 has to his avatar on the Notification Application 140, the chance of successfully transmitting important messages, like how to maintain hygiene and/or which rules to follow in a pandemic, can be increased. In another example, the Notification Application 140 can be utilized to preventively educate kids about behaviors in the event of an earthquake or any other emergency scenario. With the help of new technology, these new animated messages can, in such a crisis, be produced within a relatively short period of time, from hours to one day. The Notification Application 140 will be a helpful solution in time of need and, through the most direct way possible, can be used to inform just the right group of users 150.

For the promotional use case for the Notification Application 140, the Notification Application 140 can be utilized to promote specific products to exactly the audience of users 150 that the client wants to target. In this example we will reference a soft drink producer, like Coca Cola. For example, after creating a new animation including the product like Coca Cola the Notification Application 140 integrates this new animation in between the users' 150 chosen animations at a predefined frequency.

For the fashion/commercial use case for the Notification Application 140, the Notification Application 140 can either chose a predefined, but customizable, male or female avatar or he can create a personalized avatar with an automized photogrammetry feature that can be used with the Notification Application 140. After doing so the user 150 can, when in an environment screen, activate a wardrobe button and, by simple drag and drop and/or swipe, change clothes, accessories, and other items on his avatar. These, collectively called items, are 3D replicas of real-world items, but is not limited to only real-world items. By adding new items to a store of the Notification Application 140, the user 150 will have the opportunity to try them on his avatar while being offered to purchase them for his avatar, and the user 150 is provided with an affiliation link by the producer, such as, for example, a clothing brand. The user 150 has the option to submit his favorite brands and receives notifications about new items of his favorite brand entering the store, all from within the Notification Application 140.

Also disclosed is Automatic Modeling Software (AMS) that can be used independently or with the Notification Application 140 discussed above. AMS allows the user 150 to create a 3D avatar of themselves. AMS provides users 150 will precise instructions detailing what kind of material needs to be upload on a cloud server, where the process unfolds. AMS can include a combination of third-party software and a proprietary software solution, or alternatively just one of third-party software and a proprietary software solution. The result will be a 3D avatar of the user 150 that fulfills specific requirement(s), so that it can be instantly used, after processing, within the Notification Application 140. The user 150 can create this material with the help of a tripod, or a friend, and can be presented as a fun experience between friends. Upon activating this AMS feature, the user 150 is lead to a custom camera screen in which the user 150 will experience a customized UI for the Notification Application 140 discussed above, such as can be provided by a third-party software company. The result from this third-party photogrammetry or videogrammetry software provider is a low-quality 3D model of the user 150 with a high poly mesh and generally not a usable appearance. The AMS, combined with the third-party software, provides an automated process of creating a low polygon 3D model of the user 150. After uploading the material, the AMS imports this material into a 3D software app, such as Autodesk Maya 3D, DAZ3D, or others, and activates, automized by the AMS to produce a functional and usable low polygon 3D model specifically prepared for 3D avatars for use with the Notification Application 140, as discussed above. These models fulfill specific requirements for the user 150 to be able to change his clothes and accessories, as well as for the animation team discussed above to be able to work with the Notification Application 140.

For example, Autodesk Maya 3D can perform the following functions. Autodesk Maya 3D can perform automatic retopology to reduce the amount of geometry to an acceptable amount and to produce a straight geometry for the newly created model for a rigging process. The Autodesk Maya 3D can perform automatic adaptation of the UV map on the model. The Autodesk Maya 3D can then bake the first models' texture onto the newly created model with straight geometry. Autodesk Maya 3D can perform automatic rig onto the newly created model with the straight geometry. In at least one configuration, proprietary software automizes a process within Autodesk maya 3D or others so that the modeled avatar can receive a rig in an automated way. This gives an option for the user 150 to put the avatar in his favorite position or connect it to one of available motion captures, that is renders of animation only including the rig or skeleton of the avatar. The surface of the model is then automatically designated with locators for the neck, hands, torso, abdomen, length of legs etc., so the Notification Application 140 can know where different parts of clothes lie on the model the user 150 wants to try on his avatar in a 3D environment.

Thus, while Hellopet may share some similarity with the disclosure discussed above in that a pet is displayed overtop of a home screen, Hellopet does not utilize real three-dimensional avatars, as well as other functionalities, as the Notification Application 140 discussed above can do. The Notification Application 140 installs on a user's 150 computing device 130, such as any of the plurality of computing devices 130, and then allows the user 150 to select and, in at least one configuration, name an avatar the user 150 begins with. For example, the Notification Application 140, after entering a screen with a few drawn buildings, presents an avatars environment, a pet park, chatroom and others, the user 150 can enter "my room", further referred to as "environment". In this environment, the user 150 can interact with his avatar by touch and voice, as well as using and buying toys for his pet, like a bubble gun or a yarn ball for example, explicitly for animals and children using and playing with the Notification Application 140. The user 150 can also, with the Notification Application 140, exchange parts of his environment like the furniture and complete themes in the environment. The Notification Application 140 can inform the user 150 about incoming notifications from any installed app on the users' 150 computing device 130. In contrast, Hellopet, with its feature "Away Notifications", only informs the user 150 about missed calls and messages. The Notification Application 140 can share a feature with Hellopet, the "Use Fence" feature, where the user 150 can drag and drop his avatar from the Notification Application 140, while on the home screen, to yellow areas where the avatar can be dropped, and the avatar will not move from that area. The Notification Application 140 further includes a feature named "Barrier" where the user 150 can drag and drop his avatar into predefined areas, such as five (5) predefined areas, on his home screen so he will not be bothered by the avatar while actively using his device.

Another prior art is Shimeji, by Digital Cosmos. This app was created in 2014 and has not been updated since 2018. Shimeji exists as a Chrome extension, which the Notification Application 140 can share. Additional features that both apps share include that both are able to appear over all other apps and a customizable lock screen which allows the user 150 to activate their wallpaper and with that their lock screen function. Shimeji does not allow interaction with their avatars, except touch, and drag and drop. Shimeji's avatars are low quality 2D pictures were never intended to look like a 3D object, in at least one configuration in a 3D environment, in contrast to the Notification Application 140 discussed above. Apart from appearing on the user's 130 home and lock screens and the limited interaction on the home screen, Shimeji and the Notification Application 140 disclosed herein share no further similarities. The Notification Application 140 not only surpasses its competitors in quality, but also presents several features that have never been implemented before.

Thus, the Notification Application 140 can incorporate characters from any sphere of our daily life like, actors, musicians, cartoon characters, athletes and any other possible character, the Notification Application 140 is distinct from known apps that are limited to cartoon like pets and characters. The Notification Application 140 provides a private label customized app to customers who want to interact with their followers and users 150 in the most direct possible way. No window, tab, bar or anything else is needed to have this most direct interaction. Accomplishing that, the Notification Application 140 can create a direct marketing channel on a most used device, such as any of the plurality of computing devices 130. By utilizing the user's 150 favorite avatar as a medium for transmitting a client's marketing message, negative emotions users 150 have towards typical marketing channels are eliminated, thereby increasing the success rate for the client. The users 150 can also produce fresh animations, for their avatar(s), for their followers, e.g., even daily, by using a motion tracking suit. This allows for celebrities and influencers to react on daily events and communicate those with their fans, as those celebrities and influencers are accustomed to doing. The Notification Application 140 can also promote brands and partners through collaborate, by inserting customized 3D replicas of their brand and products, which will be provided to them or created for them. With the favorite avatar used as a medium between the end user 150 and the marketer, we overcome hurdles of prejudiced negative feelings towards classical advertisement.

As discussed above, the Notification Application 140 provides for an avatar, for example a 3D avatar, that is presented on a transparent home screen or non-transparent environment within the UI, that uses a proprietary customized Unity player integrated as a module into a native Android application, such as the Notification Application 140. This avatar is derived and customized on the basis of the Unity player and allows the Notification Application 140 to present real 3D objects and environments in which their avatar can move. This allows the Notification Application 140 to use functionalities of the most used tool on the market to present mobile video games, the Unity player, while showing a transparent background showing the user's 150 home screen.

For a sports application, the Notification Application 140 can include a private label version of the platform for a sports team. This version will differ in that next to most features regarding the platform disclosed herein, this version connects to an API of real time sport event sites, such as www.livescore.com and/or www.flashscore.com, for example. This allows the Notification Application 140 to present events that happen during the match of the user's 150 favorite sports team, in this example soccer, utilizing 3D animated avatars of the specific player connected to the live event. Because the Notification Application 140 can bypass the need of additional steps and clicks to another tab, window or pop up box to deliver information to the user 150, the Notification Application 140 can automatically decrease the time needed for the user 150 to receive a specific set of information. The user 150 is instantly informed about the event, for example, as soon as the user 150 unlocks their computing device, either through the lock screen or home screen. Typically, standard set of information is delivered by those sites in tabs, windows or pop up boxes, but do not also include all of the information the user 150 receives from the Notification Application 140 instantly, as discussed herein.

As a specific example, say Lionel Messi of Barcelona scores a goal in the 30th minute of a game. The Notification Application 140 receives the information from sport event site, i.e., a server hosting the sport event site, in real-time. The Notification Application 140 can display a 3D avatar of Lionel Messi randomly performing specific and predefined sets of animations associated to him scoring a goal. For example, he runs towards the user 150, Jumps in the air, yelling of happiness, throwing his fist in the air and a crowd can be displayed and/or heard on the user's 150 computing device 130 cheering in the background. In another example, when a particular player receives a red card, the Notification Application 140 can display a referee handing the particular player causing the event the card as a 3D animation on a screen of the user's 150 computing device 130. In the background, the Notification Application 140 can display to the user 150 an overview of information about the game, such as total score, when and who scored (e.g., a small football can be set into a bar, at the exact minute and name of the player under it, representing the complete match time), total minutes played, etc.

Figure 2:
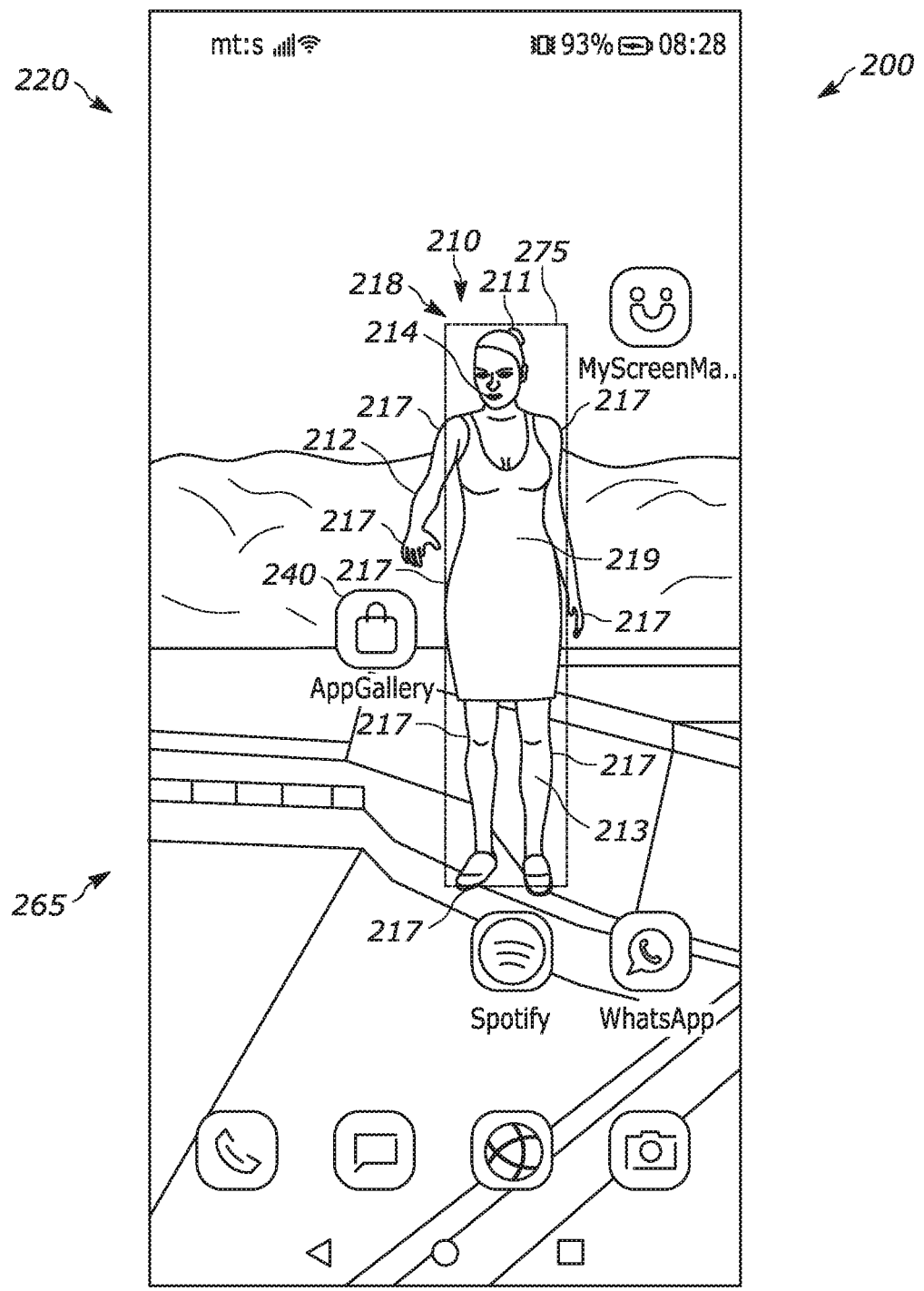
FIG. 2 illustrates an example virtual 3D assistant avatar displayed as being overlaid on an example home screen and pointing to an AppGallery app, in accordance with at least one configuration disclosed herein.

In accordance with the disclosure above, an example screenshot 200 for an Android cell phone is shown in FIG. 2 in which the Notification Application 140 displays a 3D object, in this example an avatar, such as a 3D virtual assistant avatar 210 displayed overlaid on a home screen, such as home screen 220 of a computing device 130 that as discussed above in this example is a cell phone. Although the 3D virtual assistant avatar 210 is shown as being displayed overlaid on the home screen 220, such is an example. The Notification Application 140 can display the 3D virtual assistant avatar 210 overlaid on any screen displayed by the computing device 130. Although a 3D object is shown as an example, one skilled in the art would appreciate that such is but an example, with the disclosure applying equally to display of a two-dimensional (2D) object.

Also, the 3D virtual assistant avatar 210 is illustrated for example purposes only, and can take any form, providing the assistance discussed below. As shown, a typical home screen 220 can include icons for various apps, such as a phone app, a camera app, a WhatsApp app, a folder for Google apps, a Spotify app, a messaging app, an browser app, as shown, and/or any other apps that the user 150 desires to add to the home screen 220. The home screen 220 can further include weather information, time information, date information, connection information, etc., as shown, as is typically shown on the home screen 220. The 3D virtual assistant avatar 210 includes a transparent background 265 surrounding the 3D virtual assistant avatar 210 such that the home screen 220 can be seen behind the 3D virtual assistant avatar 210, that is through the transparent background 265. This transparent background 265 is also transparent in that the user 150 can continue to interact with the home screen 220 viewed surrounding the 3D virtual assistant avatar 210, just as the user 150 would typically interact with the home screen 220.

In at least one configuration, the 3D virtual assistant avatar 210 can be used to assist the user 150 of the computing device 130 in using their computing device 130, such as installing a new application (app) on their computing device 130. The Notification Application 140 can animate the 3D virtual assistant avatar 210 such that the 3D virtual assistant avatar 210 can walk about the home screen 220, moving a head 211 of the 3D virtual assistant avatar 210, moving arms 212 of the 3D virtual assistant avatar 210, legs 213 of the 3D virtual assistant avatar 210 while the 3D virtual assistant avatar 210 is walking about the home screen 220, and in at least one configuration even a mouth 214 of the 3D virtual assistant avatar 210 while the 3D virtual assistant avatar 210 talks to the user 150 of the computing device 130. The Notification Application 140 can animate the 3D virtual assistant avatar 210 throughout this installation, such as the head 211, arms 212, legs 213, a torso 219, and even the mouth 214. During this assistance of installing the app on their computer device 130, the Notification Application 140 can in at least one configuration also provide audio assistance, such that the Notification Application 140 can make the 3D virtual assistant avatar 210 appear to be talking to the user 150 throughout the installation assistance.

Figure 3:
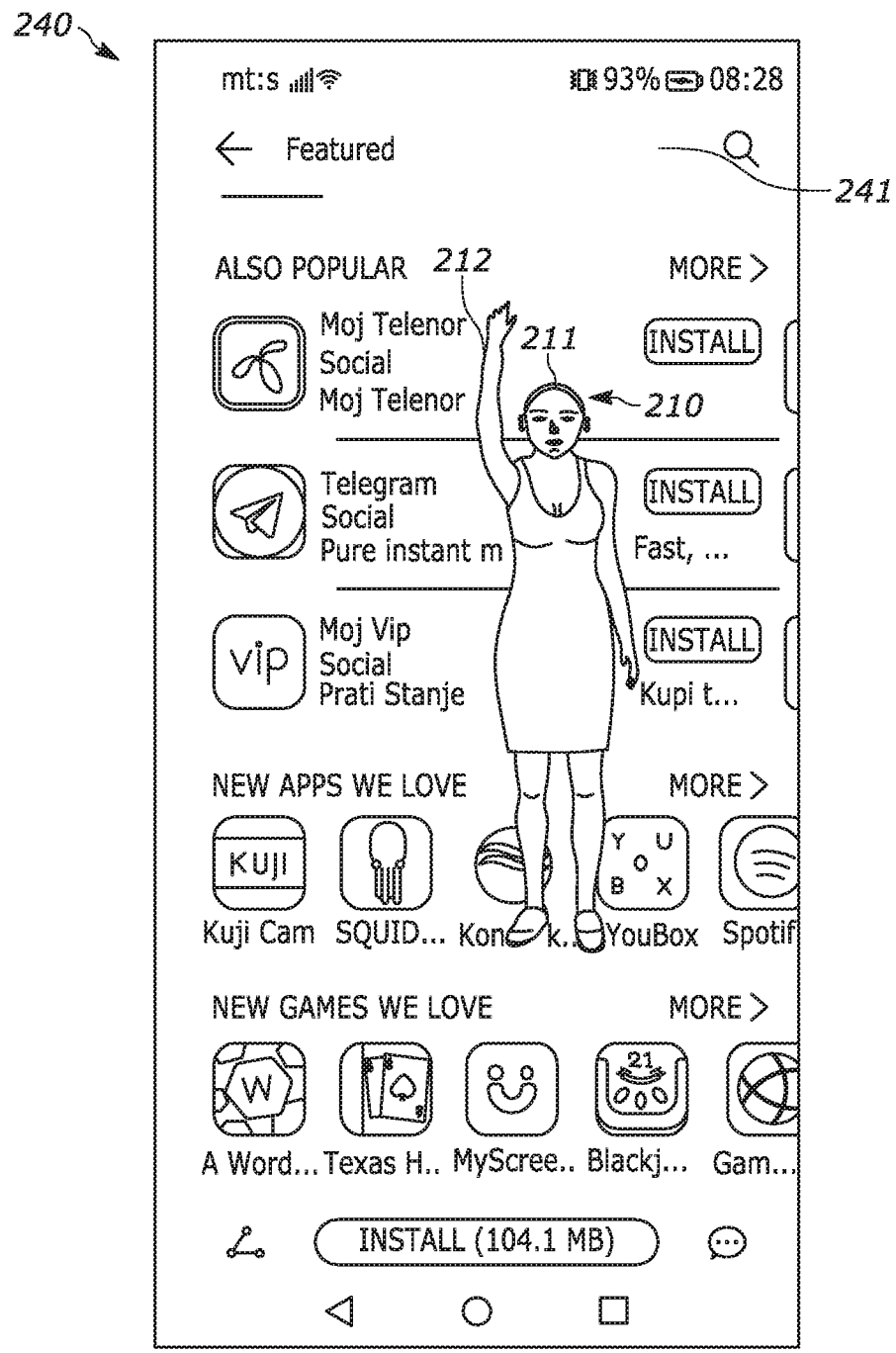
FIG. 3 illustrates the virtual 3D assistant avatar shown in FIG. 2 displayed overlaid on the AppGallery app as it is running, in accordance with at least one configuration disclosed herein.

To assist the user 150 with finding the app that they desire to install on their computing device 130, the 3D virtual assistant avatar 210 walks across the home screen 130 and stops proximate to an AppGallery app 240 displayed by their computing device 130, provided by HUAWEI corporation. The Notification Application 140 animates the 3D virtual assistant avatar 210 such that one of the arms 212 points to the AppGallery app 240. This pointing instructs the user 150 of the computing device 130 to activate or "run" the AppGallery app 240, which results in the running AppGallery app 240 filling a display of the computing device 130, shown in FIG. 3. Although the 3D virtual assistant avatar 210 is shown herein overlaid while assisting the user 150 with installing a desired app, such is just one example. One of ordinary skill in the art would understand that the 3D virtual assistant avatar 210 can be overlaid on any number of apps and screens of the computing device 130, for any number of functions.

As shown, the Notification Application 140 continues to display the 3D virtual assistant avatar 210 on the display of the computing device 130 such that the 3D virtual assistant avatar 210 is displayed overlaid on as the AppGallery app 240 is running on the computing device 130. The running AppGallery app 240 is shown as displaying for the user 150 popular apps, new apps, and games, that may be of interest to the user 150. Again, to assist the user 150 with installing a desired app, the Notification Application 140 animates the 3D virtual assistant avatar 210 such that the arm 212 of the 3D virtual assistant avatar 210 is animated to point to a search box 241, as shown. Likewise, as shown the head 211 of the 3D virtual assistant avatar 210 has been animated such that it "looks" to the search box 241 to assist the user 150 in determining where to look for the search box 241.

Figure 4:
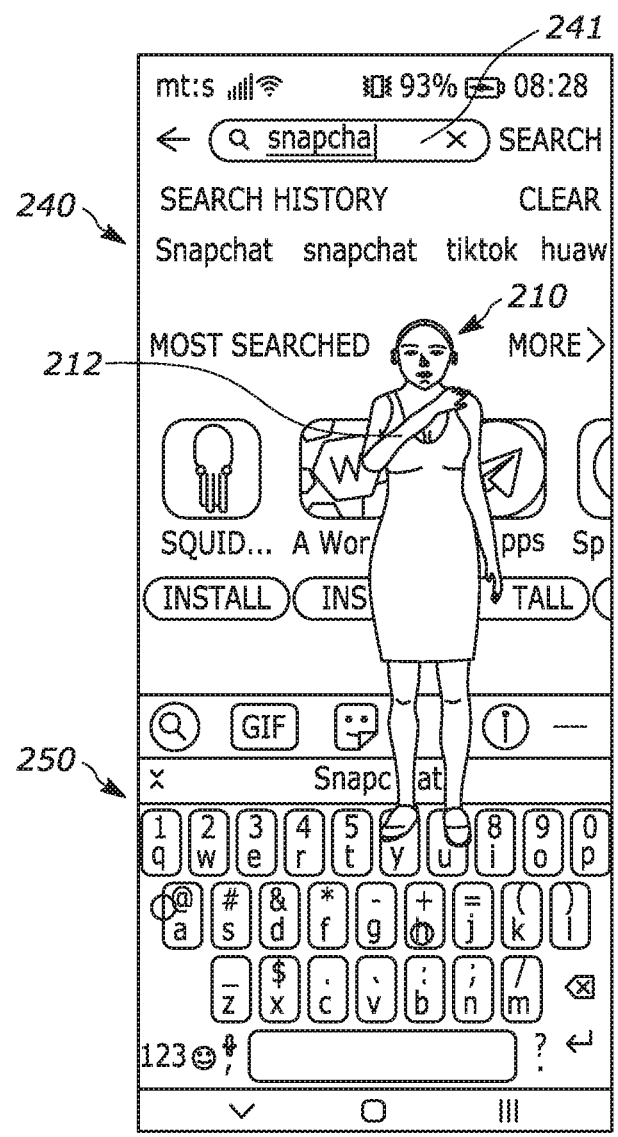
FIG. 4 illustrates the virtual 3D assistant avatar shown in FIG. 2 displayed overlaid on the AppGallery app as a user searches for a desired app, in accordance with at least one configuration disclosed herein.

FIG. 4 illustrates that the user 150 desires to install Snapchat onto their computer device 130, with the user 150 having selected the search box 241. Selection of the search box 241 is shown as resulting in a virtual keyboard 250 being displayed for the user 150 by the computing device 130. As shown, the Notification Application 140 continues to display the 3D virtual assistant avatar 210 overlaid onto the running AppGallery app 240, even overlaid onto the virtual keyboard 250 as it is being displayed for the user 150. As shown, the arm 212 of the 3D virtual assistant avatar 210 has been animated such that it is in a different position than that shown in FIG. 3.

Figure 5:
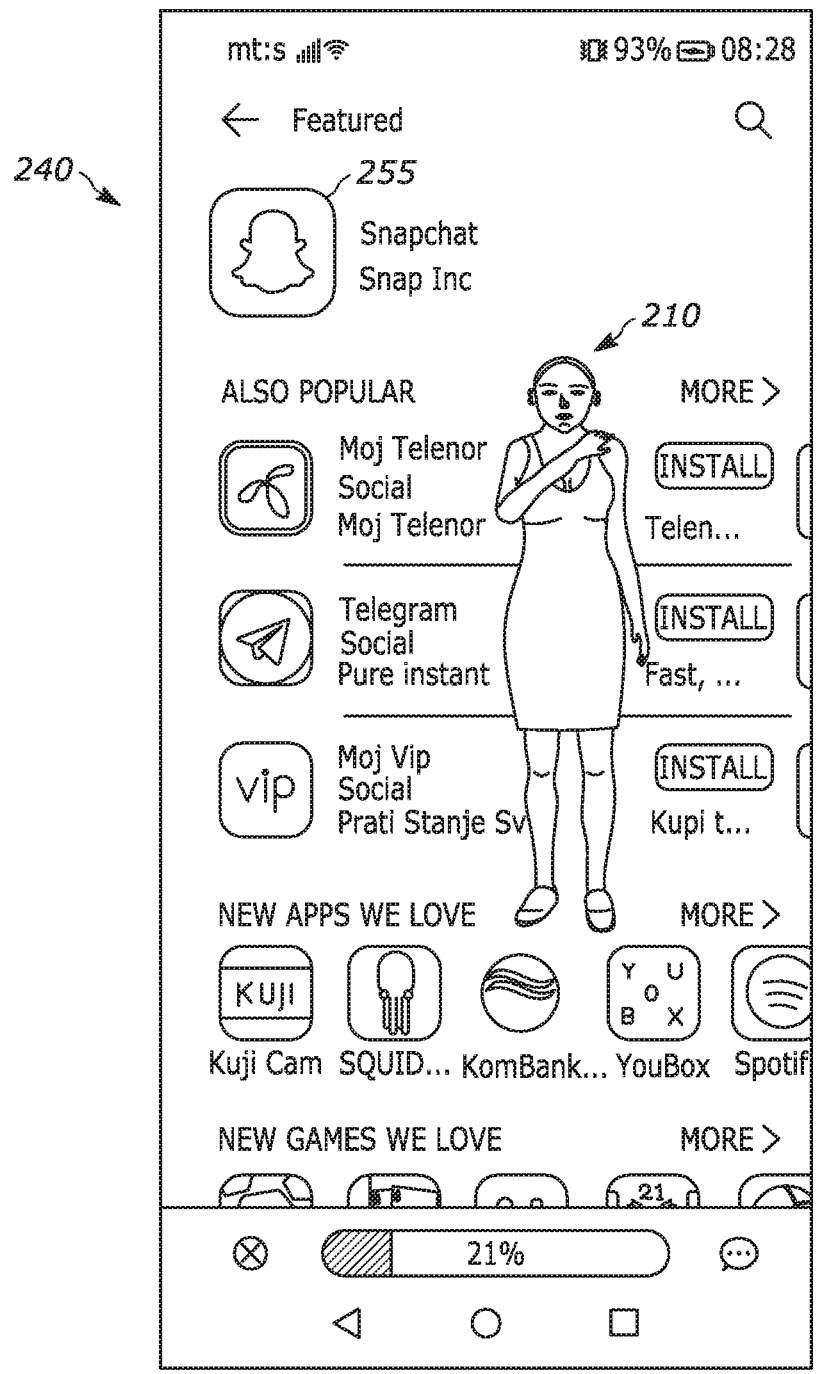
FIG. 5 illustrates the virtual 3D assistant avatar shown in FIG. 2 displayed overlaid on the AppGallery app as a searched app is installed for the user, in accordance with at least one configuration disclosed herein.

FIG. 5 illustrates the Notification Application 140 continuing to display the 3D virtual assistant avatar 210 overlaid on the AppGallery app 240 as the Snapchat app is being installed onto their computing device 130. As shown, the Notification Application 140 continues to display the 3D virtual assistant avatar 210 overlaid on the AppGallery app 240 even while the AppGallery app 240 displays a progress window 260 showing progress of the installation of the Snapchat app 255, in this example showing "21%" progress of this installation.

Figure 6:
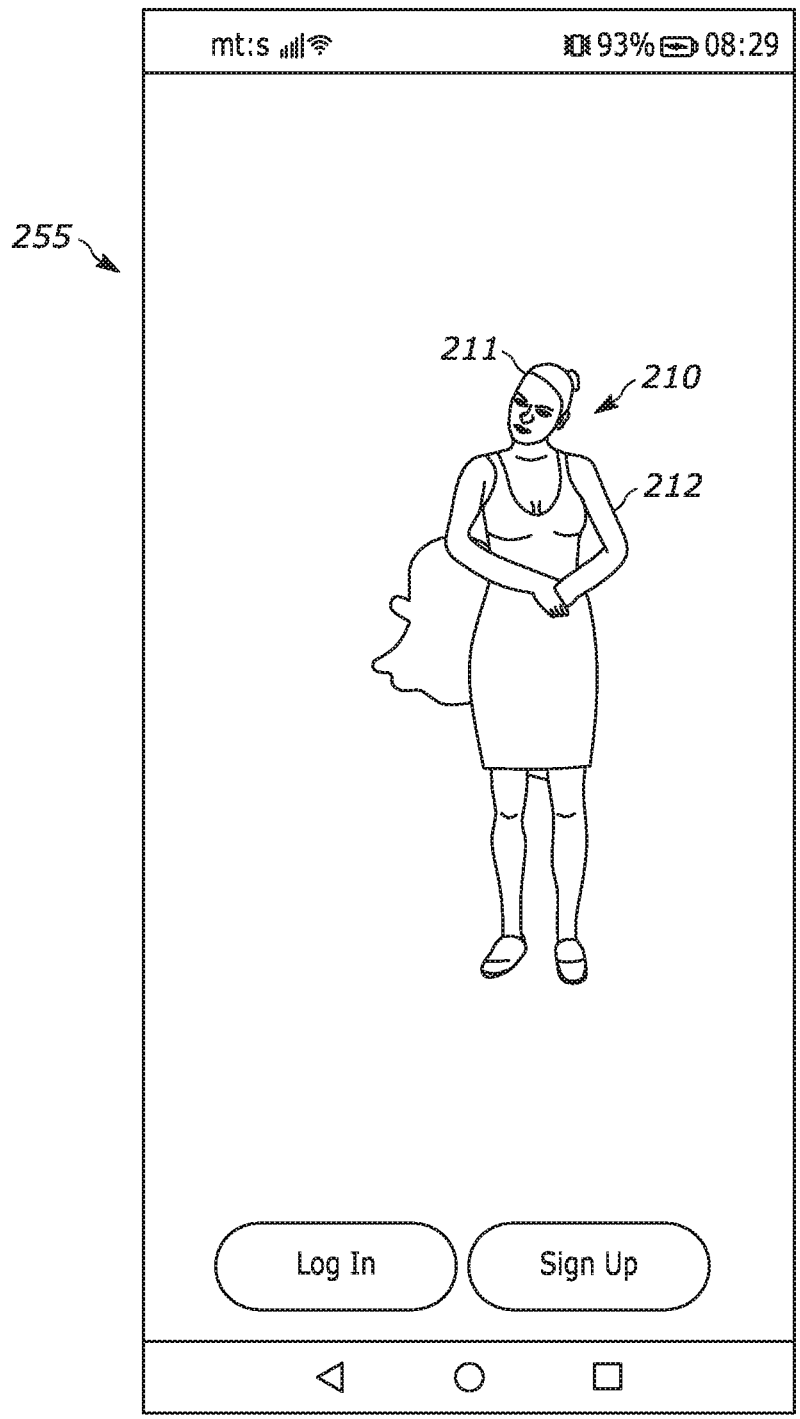
FIG. 6 illustrates the virtual 3D assistant avatar shown in FIG. 2 displayed overlaid the searched app as it begins to run, in accordance with at least one configuration disclosed herein.

Once the Snapchat app 255 has finished installing, the Notification Application 140 can continue to display the 3D virtual assistant avatar 210 overlaid on the Snapchat app 255 even after the user 150 has selected to run the Snapchat app 255, shown in FIG. 6. From this point, although not shown the Notification Application 140 can continue to display the 3D virtual assistant avatar 210 overlaid on the Snapchat app 255 while the Snapchat app 255 is running to assist the user 150 in learning how to use the Snapchat app 255, similar to how the Notification Application 140 displays the 3D virtual assistant avatar 210 overlaid on the running AppGallery app 240 to assist the user 150 with installing the Snapchat app 240. As shown, the head 211 and the arms 212 of the 3D virtual assistant avatar 210 has been animated such that it is in a different position than that shown in FIG. 5.

Figure 7A:
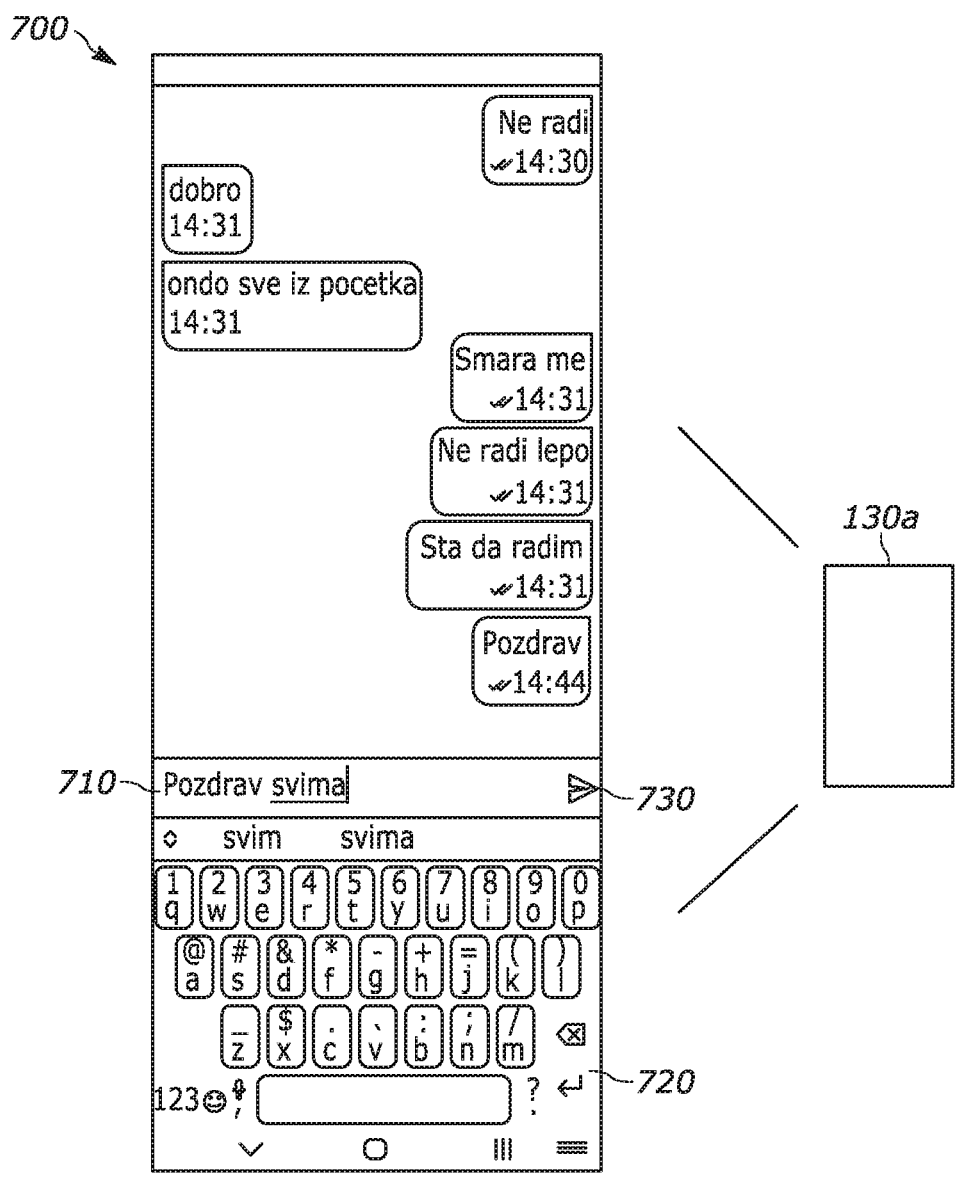
FIG. 7A illustrates an example display of a first computing device while running a messaging app, in accordance with at least one configuration disclosed herein.

With reference to FIG. 7A, a display of a first computing device, such as a first computing device 130a, but can be any of the computing devices 130a-f, is illustrated. The first computing device 130a can display a running messaging app 700, which can be a default messaging app provided by the first computing device 130a. The user 150a of the first computing device 130a can enter a text message into a message box 710 via a virtual keyboard 720 displayed for the user 150a by the messaging app 700. In this example, the user 150a enters "Pozdrav svima" into the message box 710. Once the user 150a has completed entry of their desired message, the user 150a can select to send their message by activating the send icon 730.

Figure 7B:
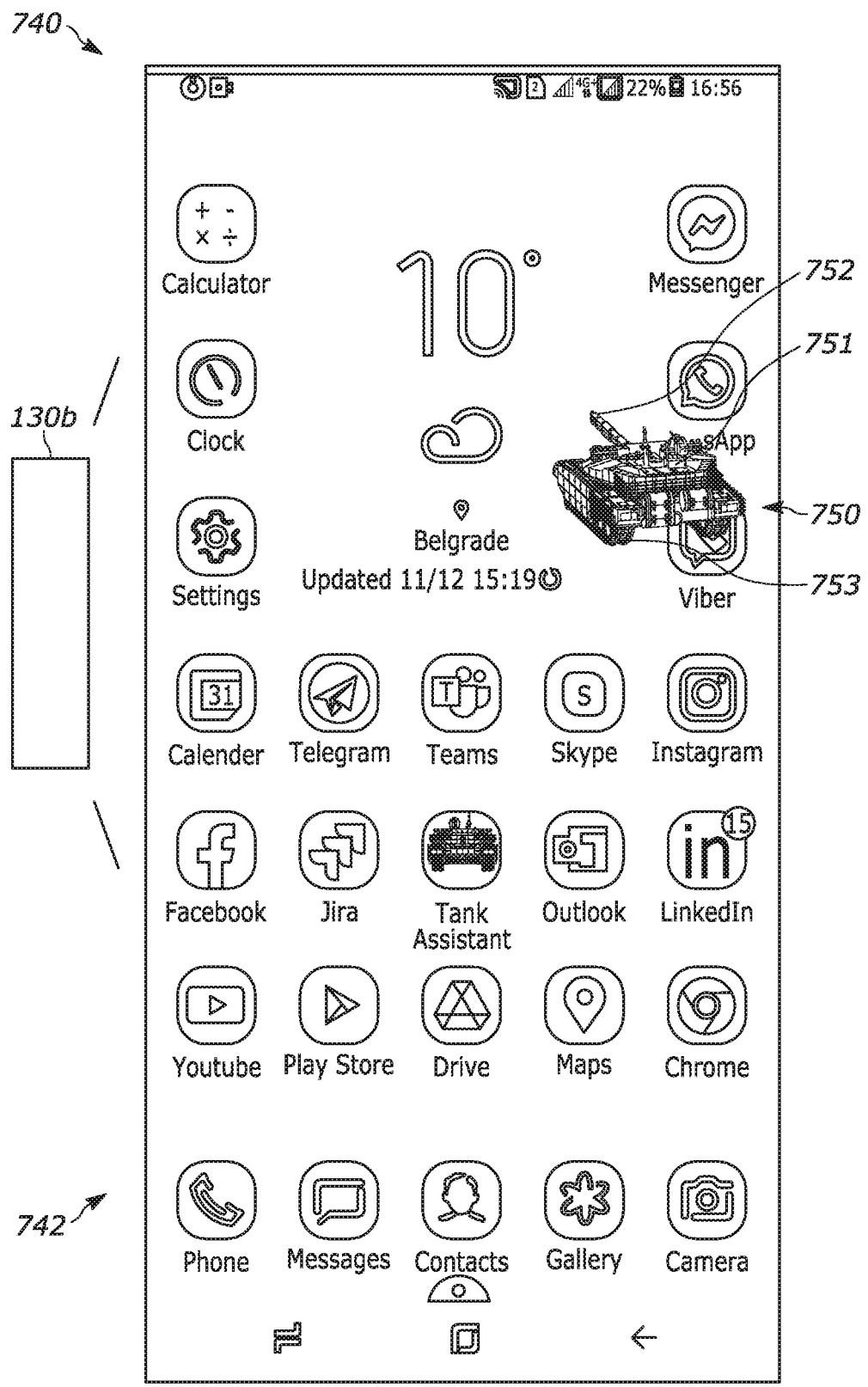
FIG. 7B illustrates an example display of a second computing device displaying an example 3D virtual notification avatar overlaid on a home screen, in accordance with at least one configuration disclosed herein.

With reference to FIG. 7B, a display of a second computing device, such as a second computing device 130b, but can be any of the computing devices 130a-f, illustrated as displaying a home screen 740 illustrating a plurality of apps 742 that are installed on the second computing device 130b. In addition to displaying the plurality of apps 742, the Notification Application 140 running on the second computing device 130b displays a 3D object that in this example is a 3D virtual notification avatar, such as a 3D virtual tank avatar 750 overlaid on the home screen 740. The 3D virtual tank avatar 750 includes a transparent background such that the home screen 740 can be seen behind the 3D virtual tank avatar 750. The Notification Application 140 can animate the 3D virtual tank avatar 750 such that the 3D virtual tank avatar 750 can roll about the home screen 740, and can move a turret 751, a barrel 752, and tracks 753, of the 3D virtual tank avatar 750.

Figure 8A:
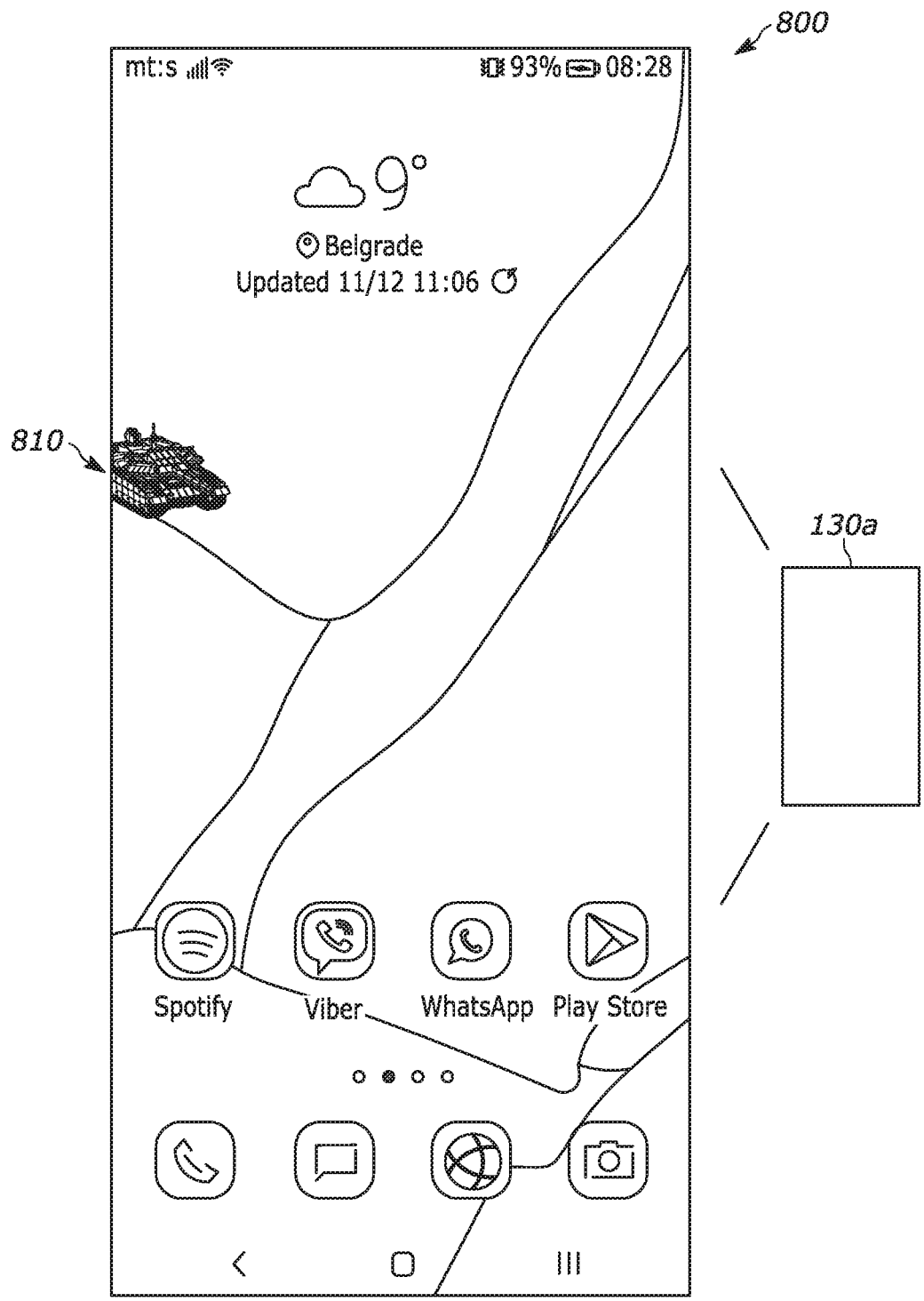
FIG. 8A illustrates an example home screen of the first computing device of FIG. 7A displaying another example 3D virtual notification avatar, in accordance with at least one configuration disclosed herein.

With reference to FIG. 8A, once the first computing device 130a sends the message that is shown in FIG. 7A, the user 150a of the first computing device 130a can select to either close the messaging app 700 or hide the messaging app 700, with the first computing device 130a then displaying home screen 800. The Notification Application 140 can display another 3D virtual tank avatar, such as 3D virtual tank avatar 810, overlaid onto the home screen 800. The 3D virtual tank avatar 810 includes a transparent background such that the home screen 800 can be seen behind the 3D virtual tank avatar 810. Particularly, FIG. 8A shows the 3D virtual tank avatar 810 rolling onto the home screen 800, from the left side of the home screen 800. FIG. 8C shows the same 3D virtual tank avatar 810 after having rolled further to the right than that shown in FIG. 8A. The 3D virtual tank avatar 810 in FIG. 8C also appears larger than that shown in FIG. 8A, which represents the 3D virtual tank avatar 810 having rolled "closer" to the user 150 of the computing device 130a.

Figure 8B:
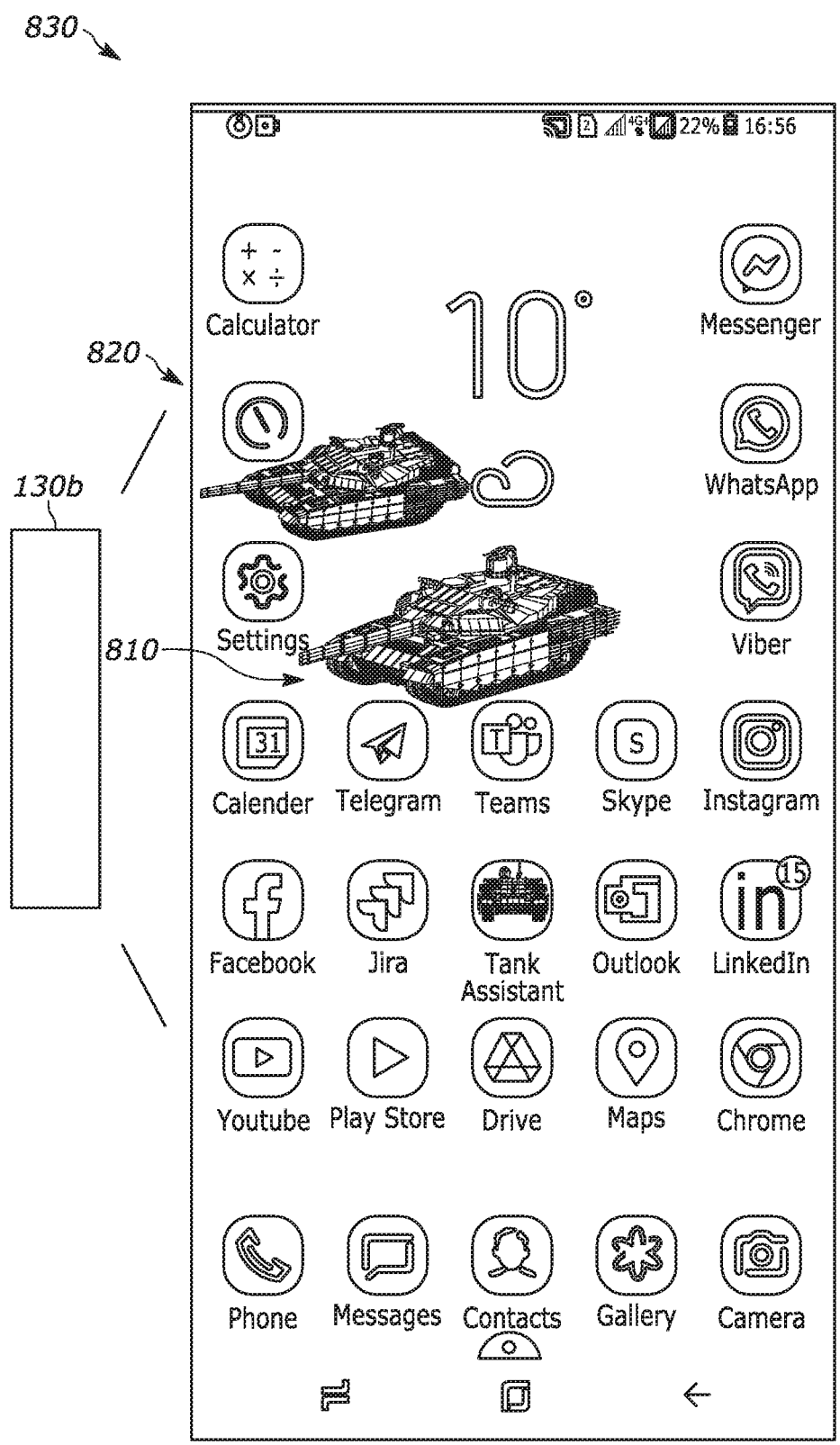
FIG. 8B illustrates the home screen of the second computing device of FIG. 7B displaying two avatars, in accordance with at least one configuration disclosed herein.
Figure 8C:
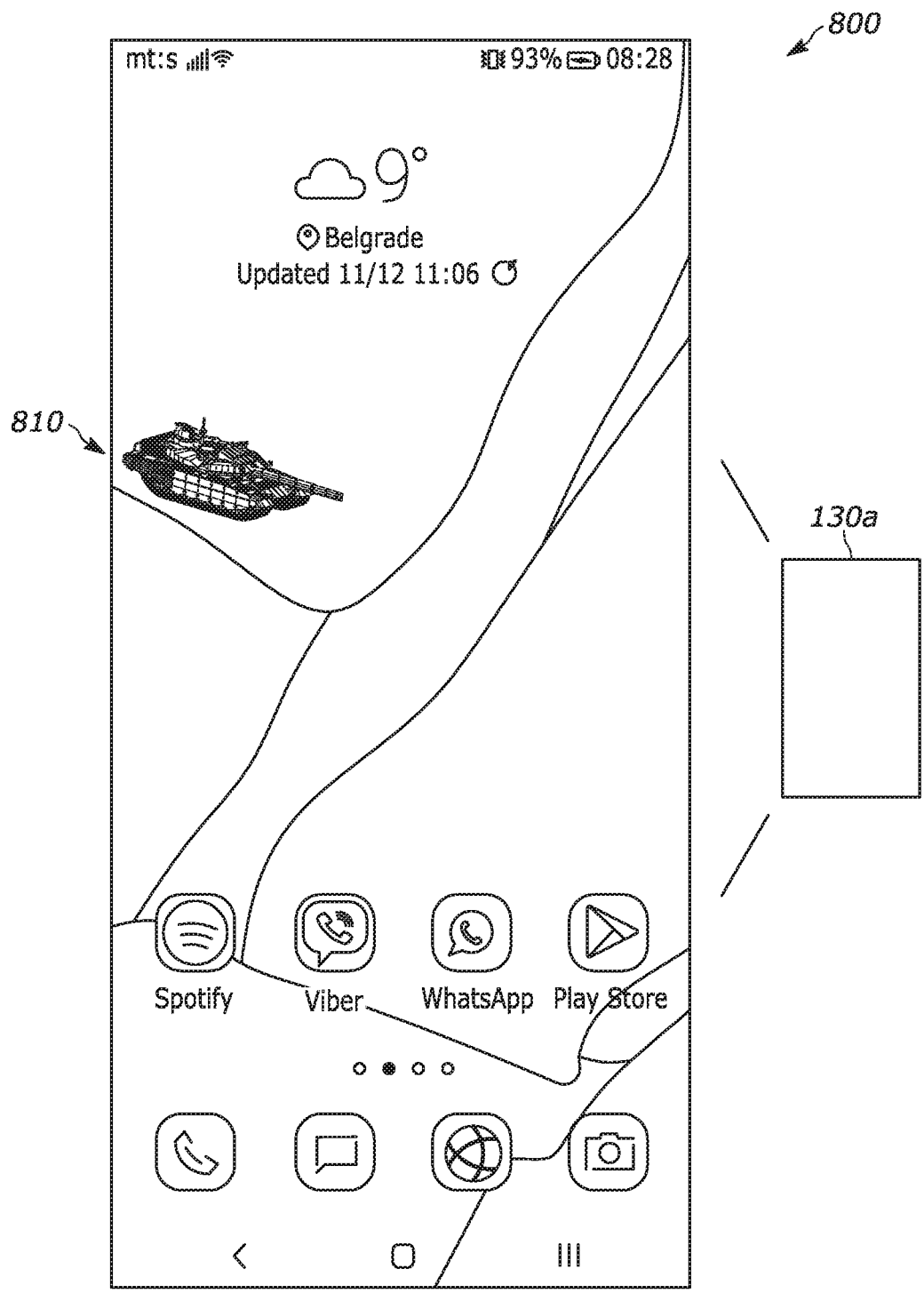
FIG. 8C illustrates the home screen shown in FIG. 8A with the 3D virtual notification avatar after having been animated, in accordance with at least one configuration disclosed herein.

With reference to FIG. 8B, the Notification Application 140 can display another 3D virtual tank avatar, such as 3D virtual tank avatar 820, overlaid onto a home screen 830 displayed on the second computing device 130*b*. The 3D virtual tank avatar 820 includes a transparent background such that the home screen 830 can be seen behind the 3D virtual tank avatar 820. As can be seen, the 3D virtual tank avatar 810 displayed on the first computing device 130*a* is of a different type of 3D virtual tank avatar from the 3D virtual tank avatar 750. In at least one configuration, the Notification Application 140 can allow users 130*a*, 130*b* of the first and second computing devices 130, respectively, to select their 3D virtual tank avatars from a list of pre-configured 3D virtual tank avatars, or even to custom make 3D virtual tank avatars, allowing the uses 150*a*, 150*b* to select such things as, e.g., a model of tank, a size of their 3D virtual tank avatar, colors of their 3D virtual tank avatar, graphics displayed on their 3D virtual tank avatar, etc.

The Notification Application 140 executing on the second computing device 130*b* can receiving information of which 3D avatar is being displayed on the first computing device 130*a*, and use that information to display that same 3D avatar on the second computing device 130*b*. With reference to FIG. 8B, the Notification Application 140 can display another 3D virtual tank avatar, such as 3D virtual tank avatar 820, overlaid onto a home screen 830 displayed on the second computing device 130*b*. The 3D virtual tank avatar 810 displayed on home screen 830 also includes a transparent background such that the home screen 830 can be seen behind the 3D virtual tank avatar 810. Although two objects are shown, any number of objects (e.g., 3D and/or non-3D) can be displayed by the Notification Application 140. Thus, the Notification Application 140 can display the object that was selected by the user 150*a* of the first computing device 130*a* onto the home screen 830 of the second computing device 130*b*, or even another objects selected by the user 150 of the second computing device 130*b*.

Figure 8D:
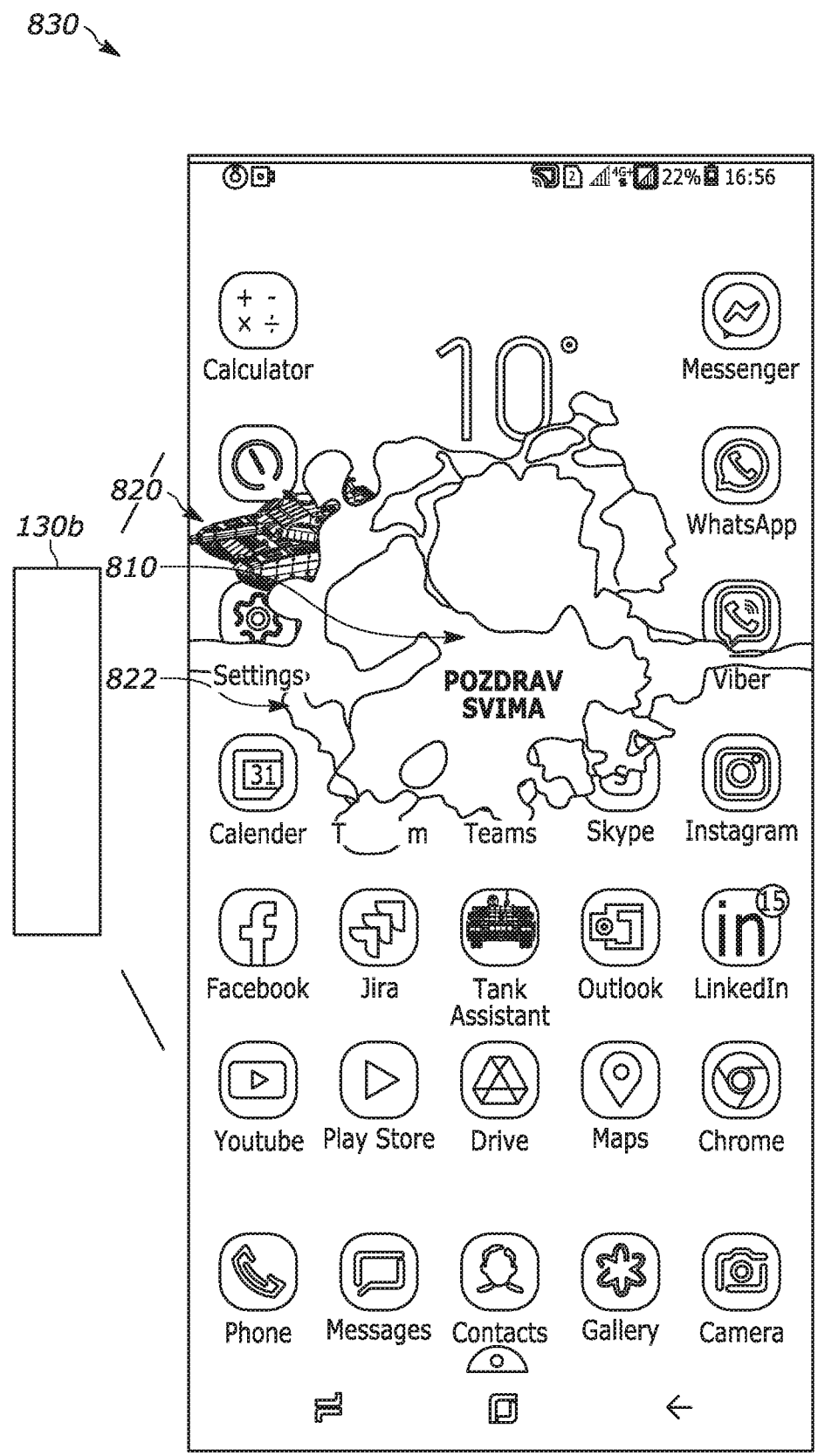
FIG. 8D illustrates the home screen shown in FIG. 8B with the avatar providing notification of a received text message, in accordance with at least one configuration disclosed herein.

With reference to FIG. 8D, in response to the second computing device 130*b* receiving and intercepting the message sent from the first computing device 130*a* show in FIG. 7A, such as via one of the plurality of servers 110*a-d*, the Notification Application 140 can display the 3D virtual tank avatar 810 rolling onto the home screen 830 and "shooting" a message at the user 150 of the second computing device 130*b*, such as within a virtual smoke cloud 822 being displayed proximate to the 3D virtual tank avatar 810. This virtual smoke cloud 822 is shown as displaying the message "Pozdrav svima" that was sent from the first computing device 130*a*, as show in FIG. 7A. Thus, in this example the same 3D virtual tank avatar 810 from the first computing device 130*a* that sends a message can be used to provide notification or "deliver" the message on the second computing device 130*b*.

One skilled in the art would appreciate that a shooting tank is but one example, the notification provided by the Notification Application 140 being able to take on a multitude of forms, e.g., a dog barking a message, a person shouting a message, a balloon popping to reveal a message within, an athlete hitting or kicking a message to the user 150, a chicken laying an egg with a message on the egg, etc. These are but examples, with one skilled in the art understanding that ways that the Notification Application 140 can provide notification to the user 150 is only limited by imagination.

Figure 9A:
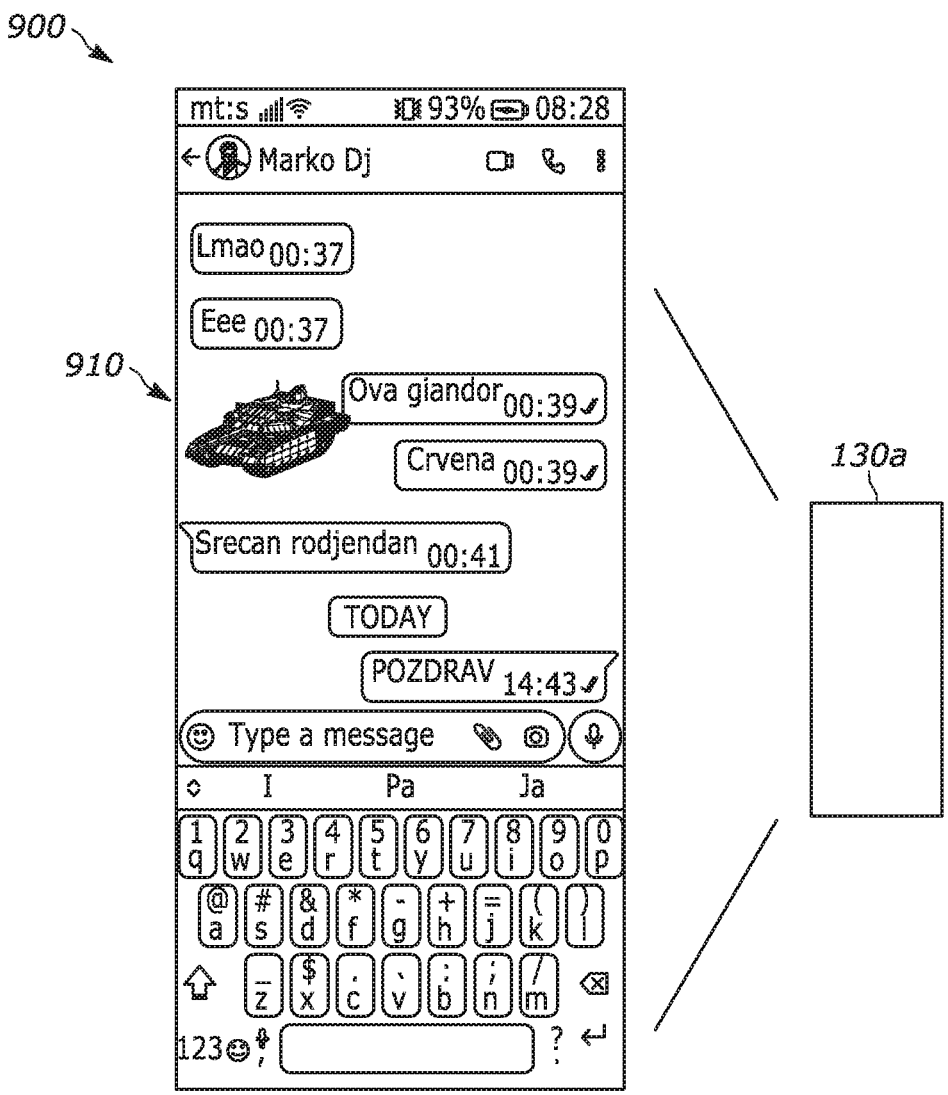
FIG. 9A illustrates the first computing device sending an example message using the WhatsApp app and display of an example 3D virtual tank avatar overlaid on the WhatsApp app, in accordance with at least one configuration disclosed herein.

With reference to FIG. 9A, a display of the first computing device 130*a* is illustrated. The first computing device 130*a* can display a running WhatsApp app 900. The Notification Application 140 running on the first computing device 130*a* is shown as displaying a 3D virtual tank avatar 910 overlaid on the WhatsApp app 900. The 3D virtual tank avatar 910 includes a transparent background such that the WhatsApp app 900 can be seen behind the 3D virtual tank avatar 910. The WhatsApp app 900 is shown after the user 150*a* of the first computing device 130*a* having sent a message "PROZDRAV".

Figure 9B:
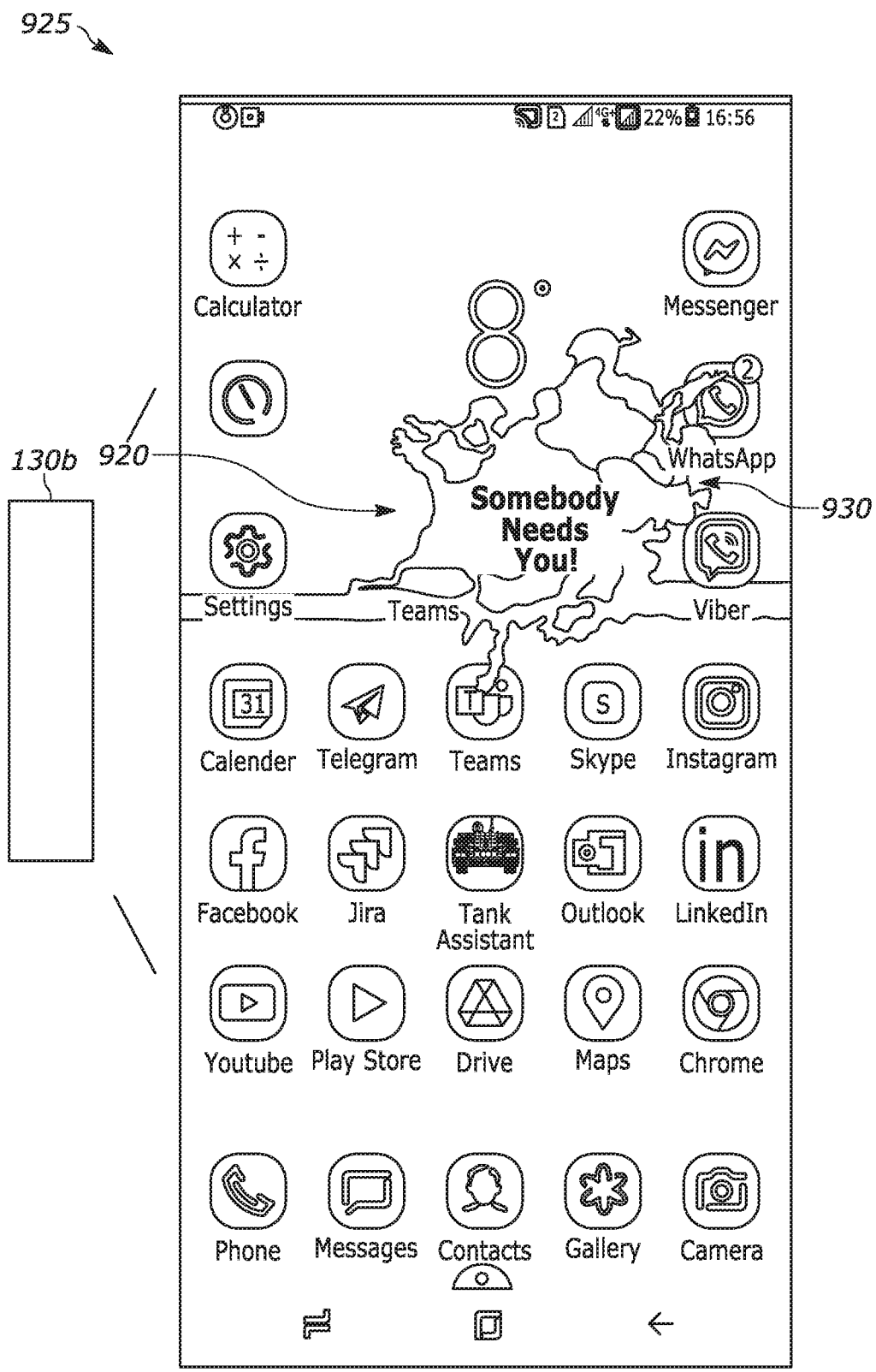
FIG. 9B illustrates the second computing device displaying an example notification "shot" from an example 3D virtual tank avatar displayed by the second computing device, in accordance with at least one configuration disclosed herein.

In this example, with reference to FIG. 9B the Notification Application 140 running on the second computing device 130*b* can display another 3D virtual tank avatar 920 displayed overlaid on a home screen 925. The 3D virtual tank avatar 920 includes a transparent background such that the home screen 925 can be seen behind the 3D virtual tank avatar 920. This 3D virtual tank avatar 920 can "shoot" a message to the user 150*b* of the second computing device 130*b*, with the Notification Application 140 displaying a smoke cloud 930 that is overlaid on the 3D virtual tank avatar 920 and at least partially obscuring view the 3D virtual tank avatar 920. This smoke cloud 930 is shown as displaying the message "SOMBODY NEEDS YOU!" to inform the user 150*b* of the second computing device 130*b* that that they have received a message.

Figure 10A:
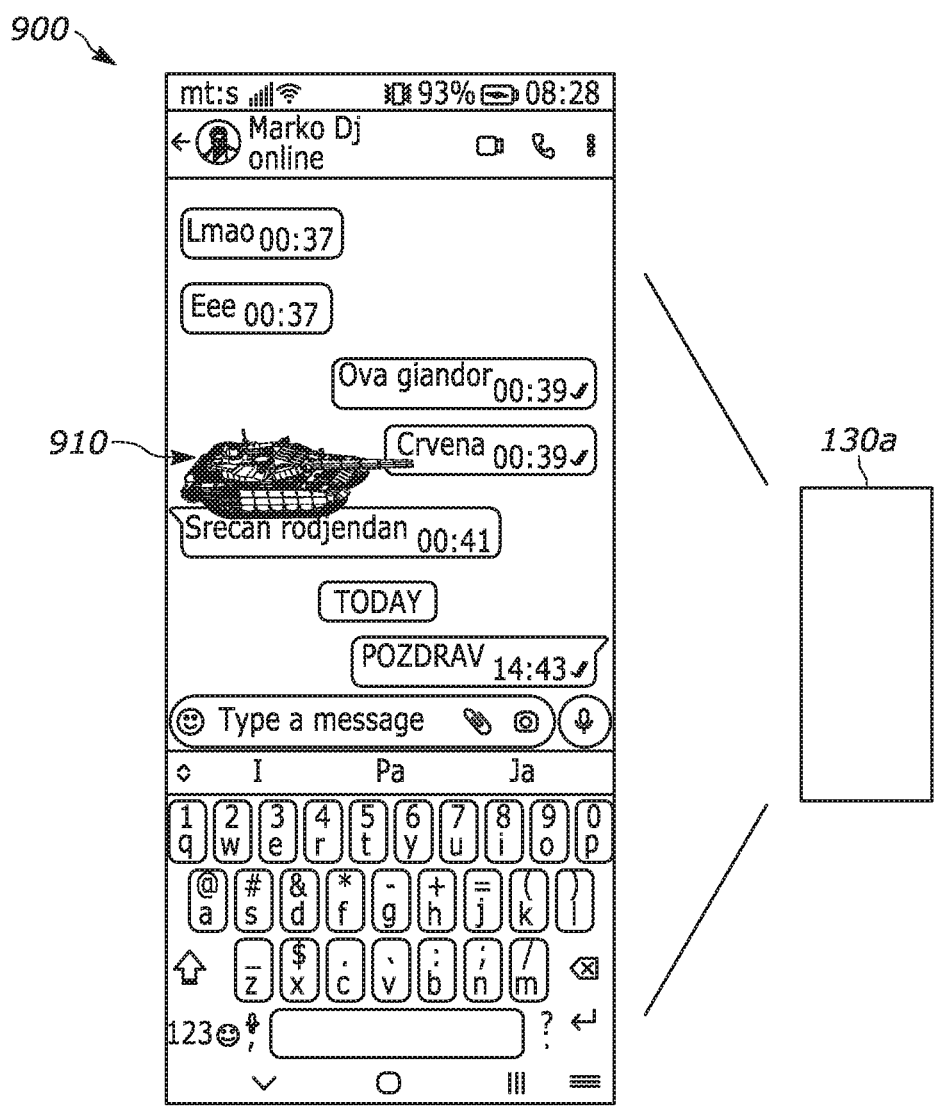
FIG. 10A illustrates the first computing device displaying a larger version of the 3D virtual tank avatar overlaid on the WhatsApp app shown in FIG. 9A, in accordance with at least one configuration disclosed herein.

With reference to FIG. 10A, a display of the first computing device 130*a* is further illustrated with the 3D virtual tank avatar 910 still overlaid on the WhatsApp app 900, but shown as being larger and from a different angle than in FIG. 9A. The Notification Application 140 can animate the 3D virtual tank avatar 910 to make it appear to be moving closer to the user 150*a*, such that the 3D virtual tank avatar 910 appears larger. Likewise, the Notification Application 140 can animate the 3D virtual tank avatar 910 to make it appears to be moving farther from the user 150*a*, such that the 3D virtual tank avatar 910 appears smaller.

Figure 10B:
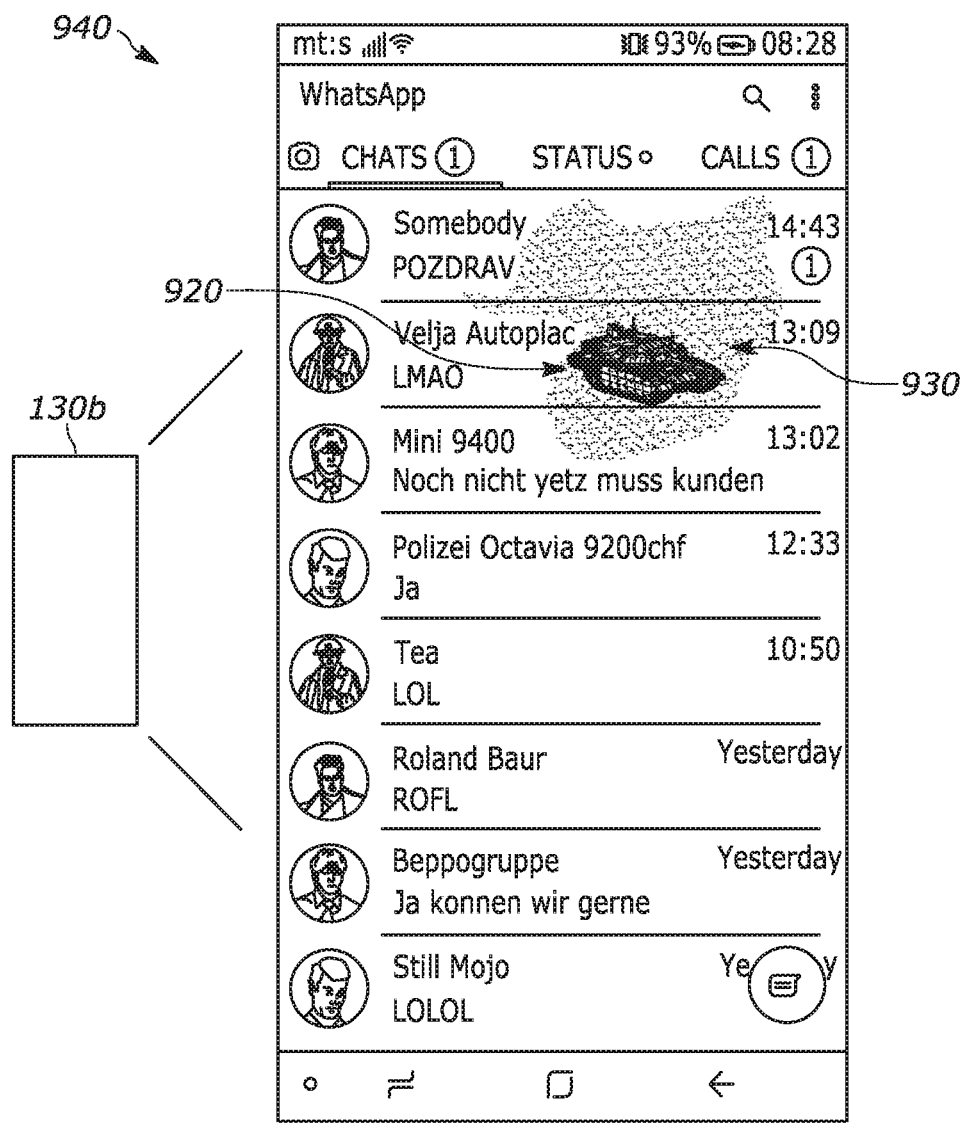
FIG. 10B illustrates the second computing device displaying a running WhatsApp app, with the 3D virtual tank avatar from FIG. 9B shown as being overlaid on the WhatsApp app, in accordance with at least one configuration disclosed herein.

After the user 150*b* of the second computing device 130*b* is notified that they have received a message, as show in FIG. 9B, in at least one configuration the Notification Application 140 can automatically trigger the second computing device 130*b* to run a WhatsApp app 940 on the second computing device 130*b*, as shown in FIG. 10B. In an alternative configuration, the user 150*b* can manually trigger the WhatsApp app 940 to run. As shown, the WhatsApp app 940 running on the second computing device 130*b* displays the message "PROZDRAV" that was sent from the first computing device 130*a*, shown in FIG. 9A. the Notification Application 140 can continue to display the 3D virtual tank avatar 920 as overlaid on the WhatsApp app 940. The smoke cloud 930 shown in FIG. 10B is shown as dissipating from that shown in FIG. 9B, the dissipating smoke cloud 930 shown as no longer displaying the message "SOMBODY NEEDS YOU!".

Figure 11:
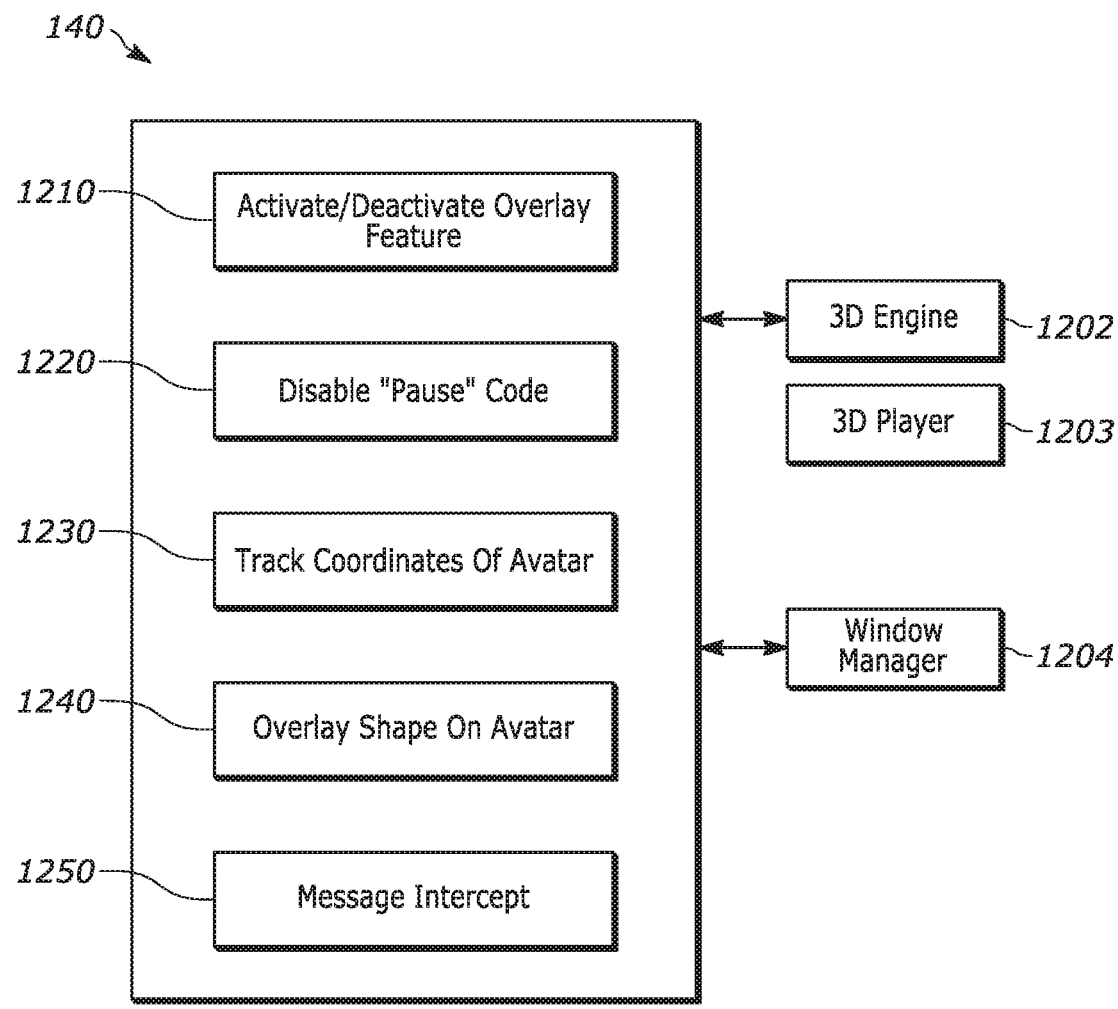
FIG. 11 illustrates an example Notification Application including a plurality of example modules, in accordance with at least one configuration disclosed herein.

FIG. 11 shows the Notification Application 140 including various modules, such as software modules. In at least one configuration, the Notification Application 140 includes an Activate/Deactivate Overlay feature module 1210, a Disable "Pause" code module 1220, a Track Coordinates of Avatar module 1230, an Overlay Shape on Avatar module 1240, and a Message Intercept module 1250. Although the Notification Application 140 is shown as including five (5) modules, one skilled in the art would understand that the Notification Application 140 can include other modules (not shown), such as a configuration module that allows the user 150 to configure the Notification Application 140 (e.g., selecting the avatar, selecting what notification will be presented by the avatar, selecting what apps the Notification Application 140 will intercept messages for, and any other configuration setting that allow customization of the Notification Application 140), among any other modules. Furthermore, although the modules 1210-1250 are referenced with increasing numbers, such is not an indication as to an order in which the modules 1210-1250 perform their functions.

The following example references the Android operating system "Android". However, one skilled in the art will understand that the description applies equally to other operating systems, such as iOS by Apple Inc., Chrome OS by Google LLC, Windows by Microsoft Corp., and Linux by Red Hat, Inc., and any other operating systems. Since Android made the window manager available for developers on the home screen of the computing devices 130 in 2016, there has been a deficiency within the art that connects a graphics engine, such as a 3D Engine 1202 (e.g., the Unity game engine), to a window manager 1204. Interactivity of the 3D Engine 1202 and its associated graphic player, such 3D player 1203, such as that by Unity Technologies, is activated by default, not matter what screen the user 150 is viewing on their computing device 130. The Notification Application 140 deactivates interactivity of the 3D player 1203 with the user 150 when the user 150 leaves a UI of the Notification Application 140, such as when the user 150 returns to a home screen. Alternatively, the Notification Application 140 can limit the user's 150 field for interaction with their avatar. If the Notification Application 140 does not deactivate this interactivity or limit the user's 150 field for interaction with their avatar, the user 150 would lose ability to interact with the home screen (or any other screen being displayed for the user 150), because the 3D player 1203 would remain on top of the home screen. Thus, the inventors appreciated that there was a need to overlay 3D objects, such as the avatar, on the user's 150 computing device 130 home screen and any other display shown on the computing device 130, such as a running app. The disclosure presented herein overcomes such a deficiency with the art.

The Notification Application 140 connects the 3D engine 1202, such as the Unity game engine by Unity Technologies or any other 3D engine, to an operating system's window manager 1204, such as Android's window manager 1204 or any other "overlay view" container provided by any other operating system. The modules 1210-1240 of the Notification Application 140 disclosed herein perform such connection.

The Notification Application 140 operates with the Unity game engine that introduced an overlay feature called "Render Over Native UI" feature in its 2017.4 version, previously named "Preserve framebuffer alpha", or any other 3D engine, such as those that allow a developer to set the alpha channel of the frame buffer. In at least one configuration, an operating system on the computing device 130 may by default have the overlay feature that provided for the overlay disclosed herein to operate, such as the "Render Over Native UI" feature from Android, disabled. The Activate/Deactivate Overlay feature module 1210 activates this overlay feature on the computing device 130 when the overlay feature disclosed herein is being used. Thereafter, when this feature is no longer being used by the Notification Application 140, the Activate/Deactivate Overlay feature module 1210 can disable or deactivate this feature, although this feature can be left activated. The Activate/Deactivate Overlay feature module 1210 further disables interactivity with the 3D player 1203 to allow the user 150 to continue interacting with a home screen or app being displayed on the computing device 130, as discussed herein.

Depending upon the 3D Engine 1202 being used, animation of 3D objects, such as the avatars disclosed herein, may cease or "pause" once the Notification Application 140, which in at least one configuration includes the 3D engine 1202, is no longer the primary app being executed by the computing device 130, that can include the 3D engine 1202, is still active but becomes a background app. To prevent this, in at least one configuration the Disable "Pause" code module 1220 disables code from the 3D Engine 1202 that pauses rendering in animation by the 3D Engine 1202 to occur. Thus, the animation of the avatar disclosed herein continues to occur even while the Notification Application 140, that can include the 3D Engine 1202, is relegated to being a background app.

The Track Coordinates of Avatar module 1230 tracks perimeter coordinates of an avatar, such the 3D virtual assistant and the 3D virtual tank avatars discussed above, using the 3D Engine 1202 to know where to create an interactive field. These perimeter coordinates can include a plurality of perimeter coordinates around the perimeter of the avatar. For example, FIG. 2 shows a plurality of perimeter coordinates 217 (which are not visible to the user 150) around the perimeter 218 of the 3D virtual assistant avatar 210. The Notification Application 140 can track these perimeter coordinates 217 to differentiate an area of a display displaying the avatar and an area of the display surrounding the avatar. The perimeter coordinates 217 change with movement of the 3D virtual assistant avatar 210, and likewise with changes in size of the 3D virtual assistant avatar 210. The Track Coordinates of Avatar module 1230 uses this perimeter information to position an overlay on the avatar and determine a shape that is interactive, as discussed below.

Based on knowing the perimeter coordinates 217 of the avatar from the Track Coordinates of Avatar module 1230, the Overlay Shape on Avatar module 1240 can overlay a shape, such as a square, rectangle, pentagon, octagon, circle, oval, or any other shape, on the avatar. As an example, FIG. 2 shows overlay of a square 275 on the 3D virtual assistant avatar 210. In at least one configuration, the shape is transparent, that is not visible by the user 150. The user 150 can select (e.g., touch an area of a screen or click on area of a screen with a mouse) anywhere within the area defined by this square 275 to interact with the avatar, such as the 3D virtual assistant avatar 210, not what lies behind the square 275.

Thus, the square 275 is an interactive zone for the user 150 to interact with the avatar. One skilled in the art will understand that a similar shape(s) can be overlay on the tanks discussed above to allow the user 150 to interact with their tank. In at least one configuration, the Track Coordinates of Avatar module 1230 changes a size of the shape, such as the square 275, that is the square 275 grows and shrinks, in proportion to the size of the avatar on the screen at any given time, since as discussed above the avatar can be made to look closer to the user 150 and farther from the user 150, that is the square 275 becomes larger and smaller, respectively. The Track Coordinates of Avatar module 1230 allows the user 150 to continue to interact with an area surrounding the avatar, such as the portion of the home screen 220 surrounding the avatar. The Track Coordinates of Avatar module 1230 also allows for resolution of security issues related to registering what the user 150 selects on their screen in that the Notification Application 140 only registers interaction of the user 150 with their avatar, not with an area surrounding their avatar, such as the home screen 220.

The Message Intercept module 1250 can intercept messages received by the computing device 130 and in at least one configuration animate the avatar described above accordingly. In other configurations, the Message Intercept module 1250 can perform other actions with the intercepted message other than animate the avatar. As discussed above, the Message Intercept module 1250 can intercept an incoming message, such as from a text app provided with the computing device 130 and a user 150 installed text app, such as the WhatsApp app 900. As the example discussed above, the Message Intercept module 1250 can animate the 3D virtual tank avatar 820 to appear as if the 3D virtual tank avatar 820 is "shooting" a message at the user 150.

Figure 12:
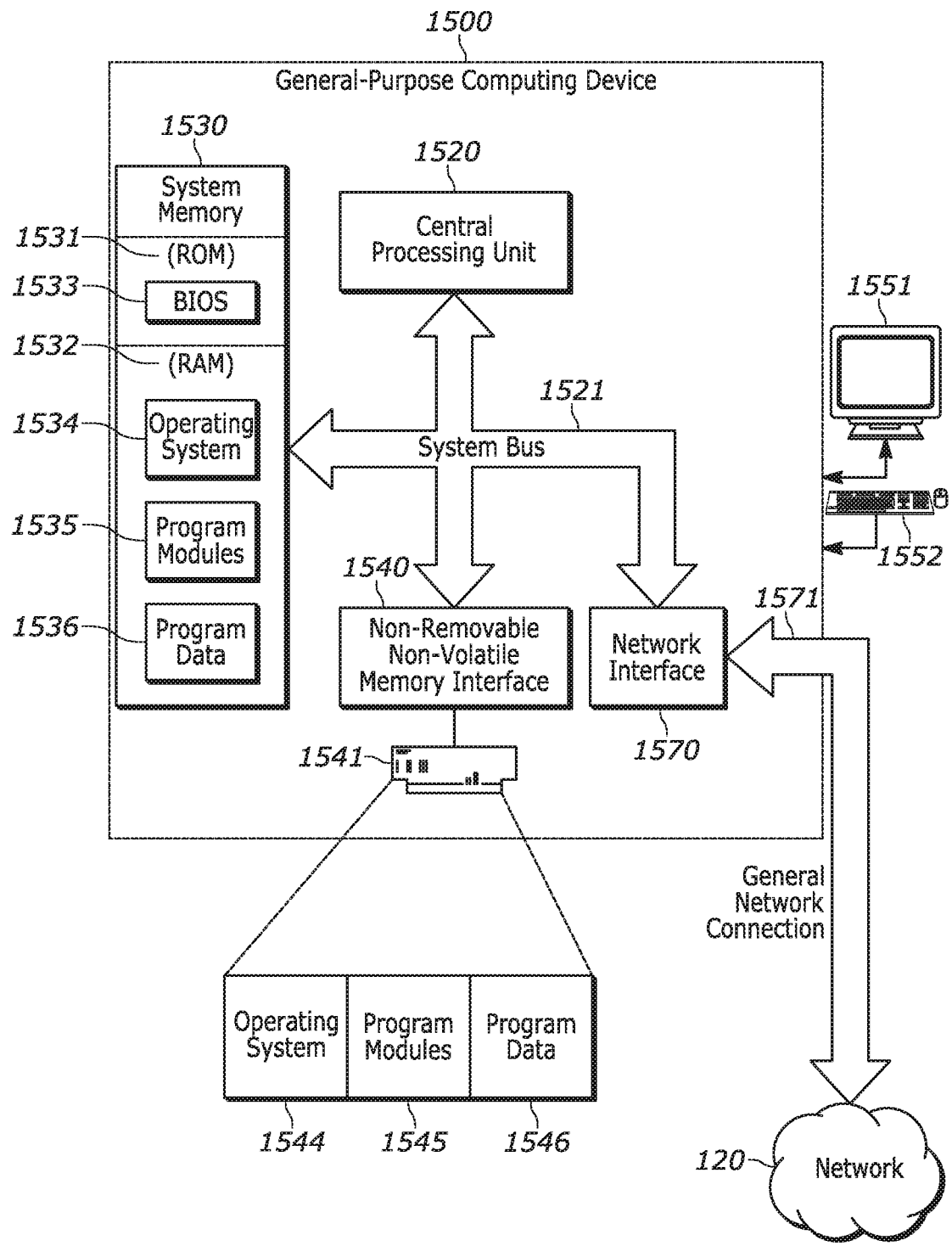
FIG. 12 illustrates an exemplary general-purpose computing device that can be any of the computing devices shown in FIG. 1, to execute the Notification Application, in accordance with at least one configuration disclosed herein.

With reference to FIG. 12, an exemplary general-purpose computing device is illustrated in the form of the exemplary general-purpose computing device 1300. The general-purpose computing device 1300 may be of the type utilized for the plurality of servers 110a-d, the plurality of computing devices 130, such as to execute the Notification Application 140, devices within the communication network 120, as well as the other computing devices which can communicate through outside another network (not shown). As such, it will be described with the understanding that variations can be made thereto.

The exemplary general-purpose computing device 1300 can include, but is not limited to, one or more of the central processing units (CPUs) 1520, such as to run or execute the Notification Application 140 discussed above, a system memory 1530, such as including a Read Only Memory (ROM) 1531 to store a Basic Input/Output System (BIOS) 1533 and a Random Access Memory (RAM) 1532, a system bus 1521 that couples various system components including the system memory to the processing unit 1520, a display 1551, and an input device, such as a keyboard and/or mouse 1552. The system bus 1521 may be any of several types of bus structures including a memory bus or memory controller, a peripheral bus, and a local bus using any of a variety of bus architectures. Depending on the specific physical implementation, one or more of the CPUs 1520, the system memory 1530 and other components of the general-purpose computing device 1300 can be physically co-located, such as on a single chip. In such a case, some or all of the system bus 1521 can be nothing more than communicational pathways within a single chip structure and its illustration in FIG. 12 can be nothing more than notational convenience for the purpose of illustration.

The general-purpose computing device 1300 also typically includes computer readable media, which can include any available media that can be accessed by computing device 1300. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 1300. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the general-purpose computing device 1300 may operate in a networked environment via logical connections to one or more remote computers. The logical connection depicted in FIG. 12 is a general network connection 1571 to the communication network 120, which can be a local area network (LAN), a wide area network (WAN) such as the Internet, or other networks. The computing device 1300 is connected to the general network connection 1571 through a network interface or adapter 1570, such as through wireless protocols (Bluetooth, 802.11a, ac, b, g, n, or the like), through wired (Ethernet, or the like) connections, and/or a cellular link can be provided for both voice and data (i.e., GSM, CDMA or other, utilizing 2G, 3G, and/or 4G data structures and the like). The network interface 1570 is not limited to any particular protocol or type of communication. It is, however, preferred that the network interface 1570 be configured to transmit data bi-directionally, through at least one mode of communication. The more robust the structure of communication, the more manners in which to avoid a failure or a sabotage with respect to communication, such as to communicate any of the messages described herein, in a timely manner, and/or through other more generic network connections, that is, in turn, connected to the system bus 1521. In a networked environment, program modules depicted relative to the general-purpose computing device 1300, or portions or peripherals thereof, may be stored in the memory of one or more other computing devices that are communicatively coupled to the general-purpose computing device 1300 through the general network connection 1571. It will be appreciated that the network connections shown are exemplary and other means of establishing a communications link between computing devices may be used.

The general-purpose computing device 1300 may also include other removable/non-removable, volatile/nonvolatile computer storage media. By way of example only, FIG. 12 illustrates a hard disk drive 1541, such as to store the Notification Application 140, that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 1541 is typically connected to the system bus 1521 through a non-removable memory interface such as interface 1540.

The drives and their associated computer storage media discussed above and illustrated in FIG. 12, provide storage of computer readable instructions, data structures, program modules and other data for the general-purpose computing device 1300. In FIG. 12, for example, hard disk drive 1541 is illustrated as storing operating system 1544, other program modules 1545, and program data 1546. Note that these components can either be the same as or different from operating system 1534, other program modules 1535 and program data 1536. Operating system 1544, other program modules 1545 and program data 1546 are given different numbers here to illustrate that, at a minimum, they are different copies.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

The invention claimed is:

1. A computing device, comprising:
a display; and
a processor to execute: a graphics engine to display, on the display, an object overlaid on a home screen of the computing device, the object including a transparent background that allows a user to interact with the home screen of the computing device, while the object is overlaid on the home screen of the computing device, wherein the object overlies the home screen of the computing device and is unrelated to the home screen of the computing device; and
a notification application to track perimeter coordinates of the object, the perimeter coordinates differentiating an area of the display displaying the object and an area of the display surrounding the object, and to overlay a shape on the object based on the perimeter coordinates, the shape being an interactive zone for the user to interact with the object;
wherein the object is an avatar, with the avatar being a three-dimensional (3D) avatar, with the avatar being separate from the home screen of the computing device,
wherein the notification application further to intercept a text message received by the computing device from at least one server and to provide a notification, with the avatar, of the interception of the text message.

2. The computing device according to claim 1, wherein a size of the object changes on the display, with a size of the shape changing in accordance with a size of the object.

3. The computing device according to claim 1, wherein the avatar is a virtual 3D assistant avatar, with the graphics engine animating at least one of a head, an arm, a leg, and a mouth, of the virtual 3D assistant avatar.

4. The computing device according to claim 3, wherein the application is a first application, the virtual 3D assistant avatar assisting a user of the computing device with installing a second application on the computing device.

5. The computing device according to claim 1, wherein the graphics engine is the Unity game engine by Unity Technologies.

6. The computing device according to claim 1, wherein the shape is one of a square, rectangle, pentagon, octagon, circle, and oval.

7. The computing device according to claim 1, wherein the notification application further to activate an overlay feature within an operating system running on the computing device to display, on the display, the object overlaid on the home screen of the computing device.

8. The computing device according to claim 1, wherein the notification application further to disable interactivity by the user with a graphics player to allow the user to interact with a home screen of the computing device when the user leaves a user interface of the graphics player.

9. The computing device according to claim 1, wherein the notification application further disables code, from the graphics engine, that causes rendering to pause animation of the object.

10. The computing device according to claim 1, wherein the notification application further to provide a canned notification, with the object, of the interception of the text message.

11. The computing device according to claim 1, wherein the at least one server is an Android server, an email server, a Short Message Service (SMS) server, a Multimedia Message Service (MMS) server, a Twitter server, an Instagram server, a WhatsApp server, a Viber server, a Discord server, a WeChat server, a Line server, a TextFree server, a Kik server, a Tango server, a Piip server, a Facebook Messenger server, a Google Hangouts server, and a Skype server.

12. The computing device according to claim 1, wherein the object is overlaid on a virtual keyboard, and unrelated to the virtual keyboard.

13. The computing device according to claim 1, wherein the computing device is one of a smart phone, a tablet computer, a laptop computer, a desktop computer, and a smart watch.

14. A method, comprising:
receiving a text message;
displaying, by a graphics engine on a display, an object overlaid on a home screen of the computing device, the object including a transparent background that allows a user to interact with the home screen of the computing device, while the object is overlaid on the home screen of the computing device, said step of displaying being triggered by the receipt of a text message;
tracking, by a processor executing a notification application, perimeter coordinates of the object, the perimeter coordinates differentiating an area of the display displaying the object and an area of the display surrounding the object;
overlaying, by the processor executing the notification application, a shape on the object based on the perimeter coordinates, the shape being an interactive zone for the user to interact with the object, the object being unrelated to the home screen of the computing device,
wherein the object comprises an avatar, with the avatar being a three-dimensional (3D) avatar, with the avatar being separate from the home screen of the computing device.

15. The method according to claim 14, further comprising: changing a size of the object on the display; and changing a size of the shape in accordance with a size of the object.

* * * * *